United States Patent
Choi et al.

(10) Patent No.: US 12,533,129 B2
(45) Date of Patent: Jan. 27, 2026

(54) SURGICAL INSTRUMENT

(71) Applicant: LIVSMED INC., Seongnam-si (KR)

(72) Inventors: Mi Ryoung Choi, Seongnam-si (KR); Jae Yeong Lee, Seongnam-si (KR); Woo Jung Choi, Siheung-si (KR); Hee Jin Kim, Seoul (KR); Dong Hoon Kang, Seoul (KR); Tae Jin Park, Siheung-si (KR)

(73) Assignee: LIVSMED INC., Seongnam-si (KR)

( * ) Notice: Subject to any disclaimer, the term of this patent is extended or adjusted under 35 U.S.C. 154(b) by 0 days.

(21) Appl. No.: 18/818,013

(22) Filed: Aug. 28, 2024

(65) Prior Publication Data

US 2025/0090167 A1    Mar. 20, 2025

(30) Foreign Application Priority Data

Sep. 14, 2023 (KR) .......................... 10-2023-0122696

(51) Int. Cl.
*A61B 17/072* (2006.01)
*A61B 17/00* (2006.01)

(52) U.S. Cl.
CPC .................. *A61B 17/07207* (2013.01); *A61B 2017/00477* (2013.01); *A61B 2017/00734* (2013.01)

(58) Field of Classification Search
CPC ...... A61B 17/07207; A61B 17/320092; H01R 13/6675; H01M 2/00
See application file for complete search history.

(56) References Cited

U.S. PATENT DOCUMENTS

| | | | |
|---|---|---|---|
| 2007/0244471 A1 | 10/2007 | Malackowski | |
| 2017/0086826 A1* | 3/2017 | Leimbach | A61B 17/072 |
| 2018/0028182 A1* | 2/2018 | Aldridge | A61B 18/1445 |
| 2020/0205817 A1* | 7/2020 | Nielsen | A61B 17/072 |
| 2020/0405290 A1* | 12/2020 | Shelton, IV | A61B 17/068 |
| 2020/0405293 A1* | 12/2020 | Shelton, IV | A61B 17/34 |
| 2020/0405306 A1 | 12/2020 | Shelton, IV et al. | |
| 2021/0244394 A1* | 8/2021 | Shelton, IV | A61B 17/07207 |

FOREIGN PATENT DOCUMENTS

| | | |
|---|---|---|
| CN | 104936532 B | 11/2018 |
| JP | 2011-190637 A | 9/2011 |
| WO | 2016/137813 A1 | 9/2016 |
| WO | 2018/226945 A1 | 12/2018 |

* cited by examiner

*Primary Examiner* — Nathaniel C Chukwurah
(74) *Attorney, Agent, or Firm* — Bridgeway IP Law Group, PLLC; Sang Ho Lee; Hyun Woo Shin

(57) ABSTRACT

A surgical instrument includes a manipulation part coupled to an end tool connection part and formed to control an operation of an end tool, and a driving unit formed to be detachably attached to the manipulation part and formed to supply a driving force for the operation of the end tool through the manipulation part.

19 Claims, 22 Drawing Sheets

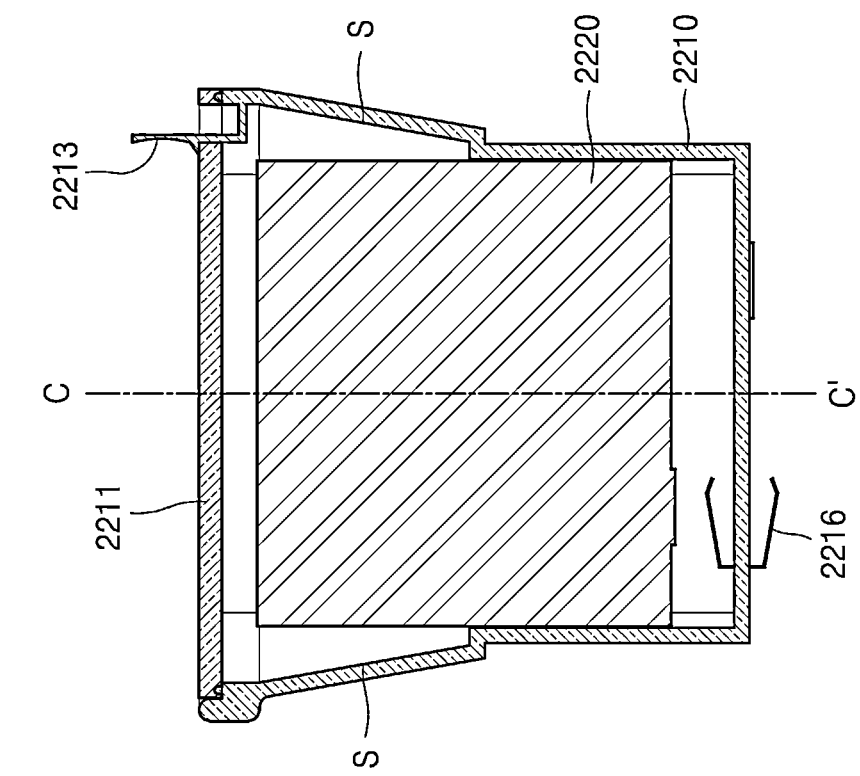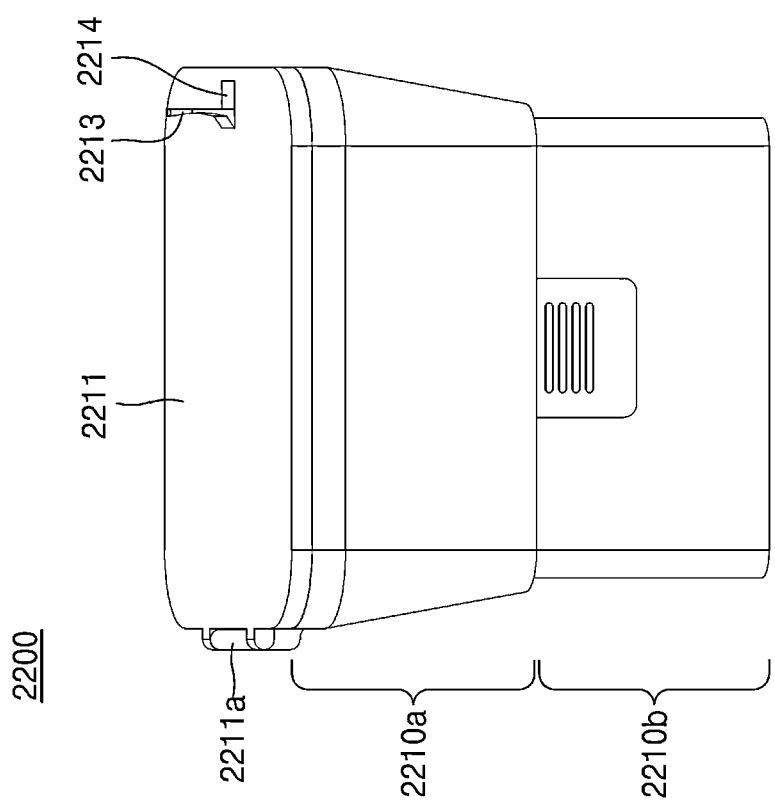
FIG. 7A
FIG. 7B

SURGICAL INSTRUMENT

CROSS-REFERENCE TO RELATED APPLICATION

This application is based on and claims priority under 35 U.S.C. § 119 to Korean Patent Application No. 10-2023-0122696, filed on Sep. 14, 2023, in the Korean Intellectual Property Office, the disclosure of which is incorporated by reference herein in its entirety.

BACKGROUND

1. Field

The disclosure relates to a surgical instrument.

2. Description of the Related Art

In medical terms, surgery refers to curing an illness by cutting, incising, or manipulating the skin, mucous membranes, or other tissues by using medical devices. In particular, open surgery, which involves cutting open the skin at the surgical site and treating, shaping, or removing the organs inside, causes problems such as bleeding, side effects, patient pain, and scarring. Therefore, surgery using a robot or surgery performed by forming a certain hole in the skin and inserting only a medical device, such as a laparoscope, a surgical instrument, or a microsurgical microscope, has recently attracted attention as an alternative.

A surgical instrument is a tool for operating on a surgical site by manipulating an end tool provided at one end of a shaft that passes through a hole drilled in the skin. A medical doctor may manipulate the end tool with his/her hand by using a certain driver, or may manipulate the end tool by using a robot arm. The end tool provided in the surgical instrument performs a rotating motion, a gripping motion, a cutting motion, or the like through a certain structure.

SUMMARY

The disclosure may provide a surgical instrument with improved product durability and user convenience.

Additional aspects will be set forth in part in the description which follows and, in part, will be apparent from the description, or may be learned by practice of the presented embodiments of the disclosure.

According to an embodiment, a surgical instrument includes a manipulation part configured to be coupled to an end tool, the manipulation assembly is configured to control an operation of the end tool, and a driving assembly detachably coupled to the manipulation assembly, wherein the driving assembly supplies a driving force for the operation of the end tool through the manipulation assembly.

In an embodiment, the manipulation assembly may include a coupling region detachably coupled with the driving assembly, and the coupling region of the manipulation assembly may include a coupling groove defined to accommodate at least one region of the driving assembly in one direction.

In an embodiment, the driving assembly may comprise a container detachably coupled to the manipulation assembly, and a battery pack insertable into the container.

In an embodiment, the container may have a plurality of regions having different widths, and a width of the container at one end of the container may be narrower than a width of the container at another end.

In an embodiment, the container may have a structure that becomes narrower from an entrance of the container into which the battery pack is inserted to at least one inner region of the container.

In an embodiment, the container may comprise an accommodation part having a space therein to accommodate the battery pack, and a cover for opening and closing the accommodation part.

In an embodiment, one end portion of a body of the cover may is coupled to one end portion of the accommodation part of the container.

In an embodiment, the container may comprise a locking structure coupled to the cover to prevent opening of the cover.

In an embodiment, the locking structure may be configured to be damaged when an external force greater than a predetermined amount is applied thereto.

In an embodiment, the driving assembly may be a battery pack for supplying power to the manipulation assembly.

According to an embodiment, a driving unit assembly configured to be detachably attached to a manipulation assembly of a surgical instrument and to supply a driving force for an operation of an end tool through the manipulation assembly includes a container configured to be detachably coupled to the manipulation assembly, and a battery pack insertable into the container.

In an embodiment, the container may have a plurality of regions having different widths, and a width of the container at one end of the container may be narrower than a width of the container at another end of the container.

In an embodiment, the container may have a structure that becomes narrower from an entrance of the container into which the battery pack is inserted to at least one inner region of the container.

In an embodiment, the container may include an accommodation part having a space therein to accommodate the battery pack, and a cover for opening and closing the accommodation part.

In an embodiment, the container may include a locking structure coupled to the cover to prevent opening of the cover part.

In an embodiment, the locking structure may be configured to be damaged when an external force greater than a predetermined amount is applied thereto.

In an embodiment, the container may further include a coupling part configured to support and fix the battery pack inside the accommodation part.

In an embodiment, the coupling part may be configured to be damaged when an external force greater than a predetermined amount is applied thereto.

According to an embodiment, a charger for charging a battery pack of a surgical instrument includes a charging device comprising a charger terminal, the charger terminal being configured to come into contact with a charging terminal of the battery pack and charge a battery of the battery pack, and a support protruding out of the charging device by a predetermined amount to support and fix the battery pack, wherein the support is configured to engage or disengage the battery pack when a predetermined pressure is applied thereto.

In an embodiment, the support may include a latch member and an elastic member, wherein the elastic member is configured to press the latch member from the inside of the charging device toward the outside, wherein the latch member is configured to be pressed by the battery pack to engage or disengage the battery pack.

Other aspects, features, and advantages of the disclosure will become better understood through the accompanying drawings, the appended claims, and the detailed description.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 7A to 7B is a perspective view and a cross-sectional view illustrating another alternative embodiment of the driving unit of the surgical instrument of FIG. 1;

DETAILED DESCRIPTION

Figure 1:
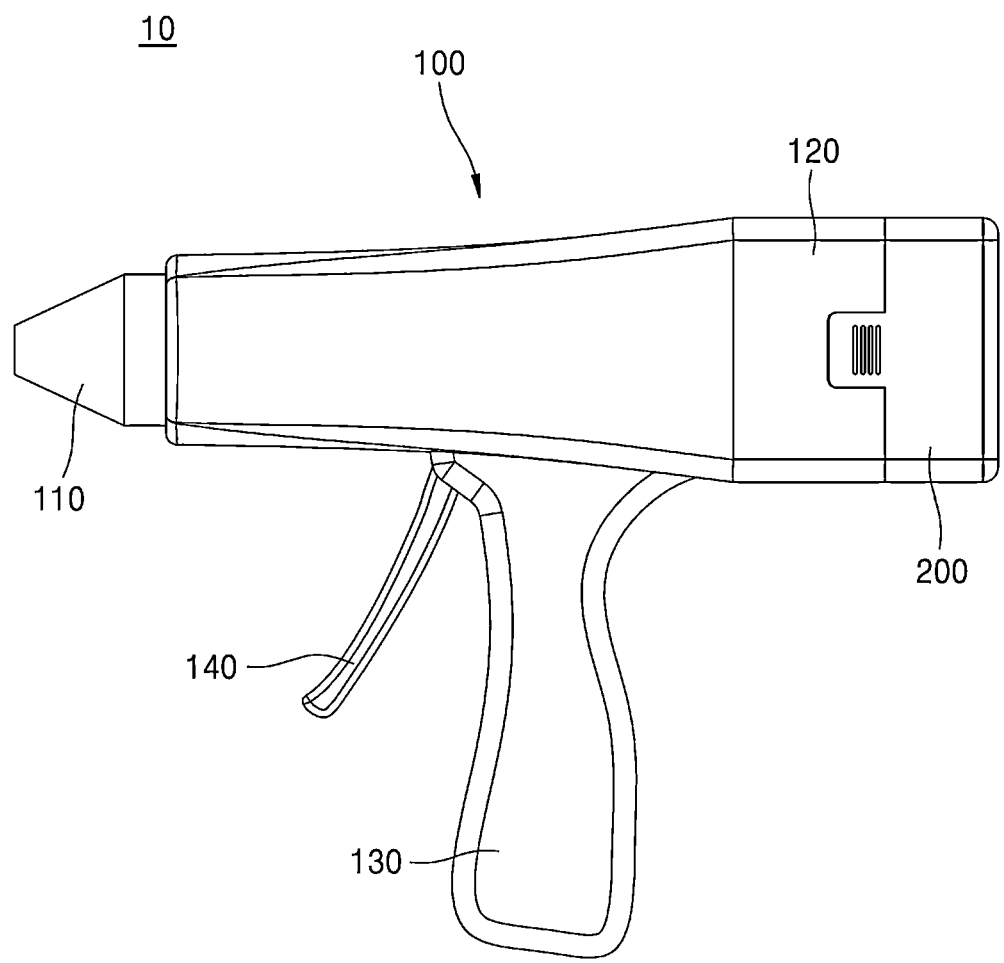
FIG. 1 is a front view illustrating a manipulation part and a driving unit of a surgical instrument according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, the following embodiments will be described in detail with reference to the accompanying drawings. When describing the embodiments with reference to the accompanying drawings, the same or corresponding elements are denoted by the same reference numerals and redundant descriptions thereof are omitted.

Since various changes may be made to the present embodiments, specific embodiments will be illustrated in the drawings and described in detail in the detailed description. Effects and features of the present embodiments, and methods of achieving them will be clarified with reference to the detailed description below along with the drawings. However, the present embodiments are not limited to the embodiments disclosed below and may be implemented in various forms.

In order to clearly explain the disclosure, the parts irrelevant to the description are omitted in the drawings and similar reference numerals denote similar parts throughout the specification.

The singular forms as used herein are intended to include the plural forms as well unless the context clearly indicates otherwise.

In the following embodiments, it will be understood that the terms "include" and/or "comprise" used herein specify the presence of stated features or elements, but do not preclude the presence or addition of one or more other features or elements.

In the following embodiments, it will be understood that, when a portion such as unit, region, or element is referred to as being "on" another portion, this may include not only a case where the portion is directly on the other portion, but also a case where intervening units, regions, or elements may be present therebetween.

In the following embodiments, it will be understood that the terms "connection" or "coupling" do not necessarily mean "direct and/or fixed connection or coupling" of two members, unless the context clearly indicates otherwise, and this does not preclude the arrangement of other members between the two members.

Also, sizes of elements in the drawings may be exaggerated or reduced for convenience of explanation. For example, since sizes and thicknesses of elements in the drawings are arbitrarily illustrated for convenience of explanation, the following embodiments are not limited thereto.

Figure 2:
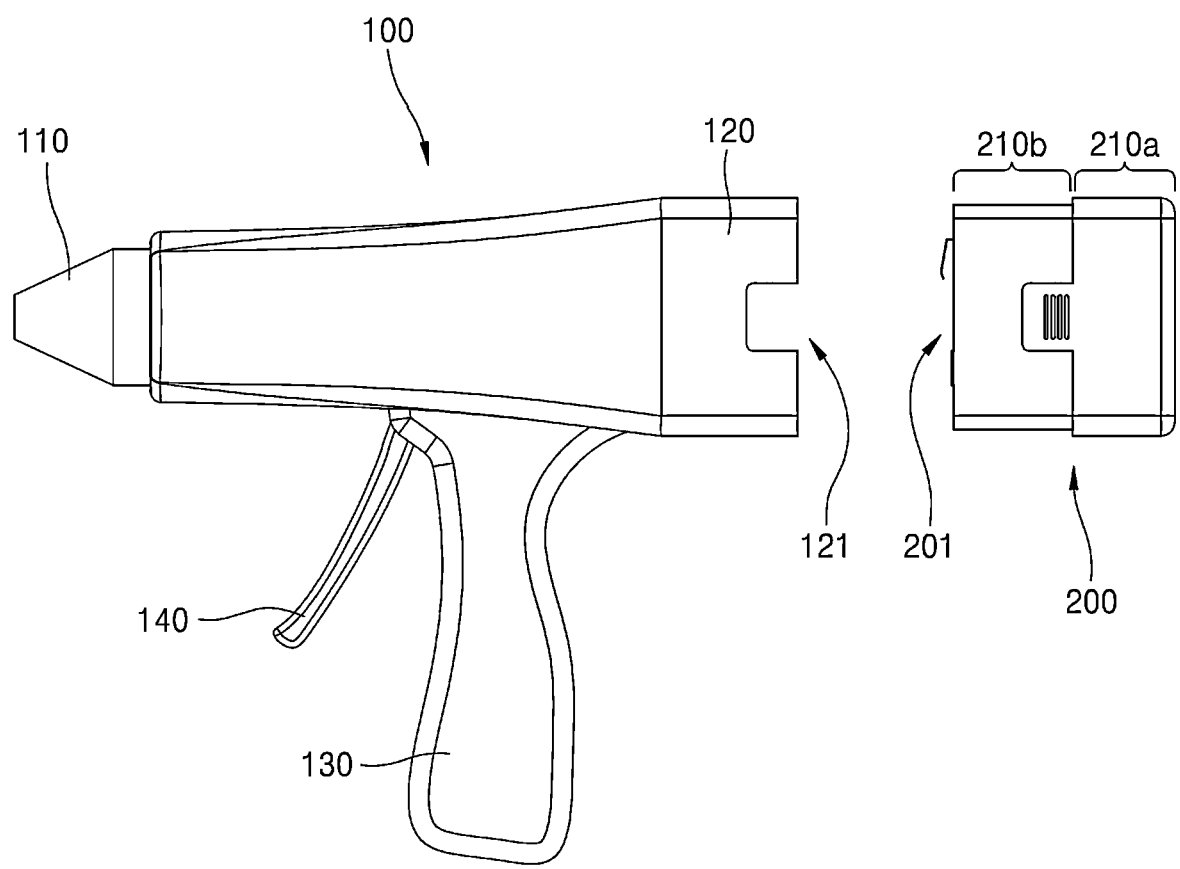
FIG. 2 is an exploded front view of the manipulation part and the driving unit of FIG. 1.
Figure 3:
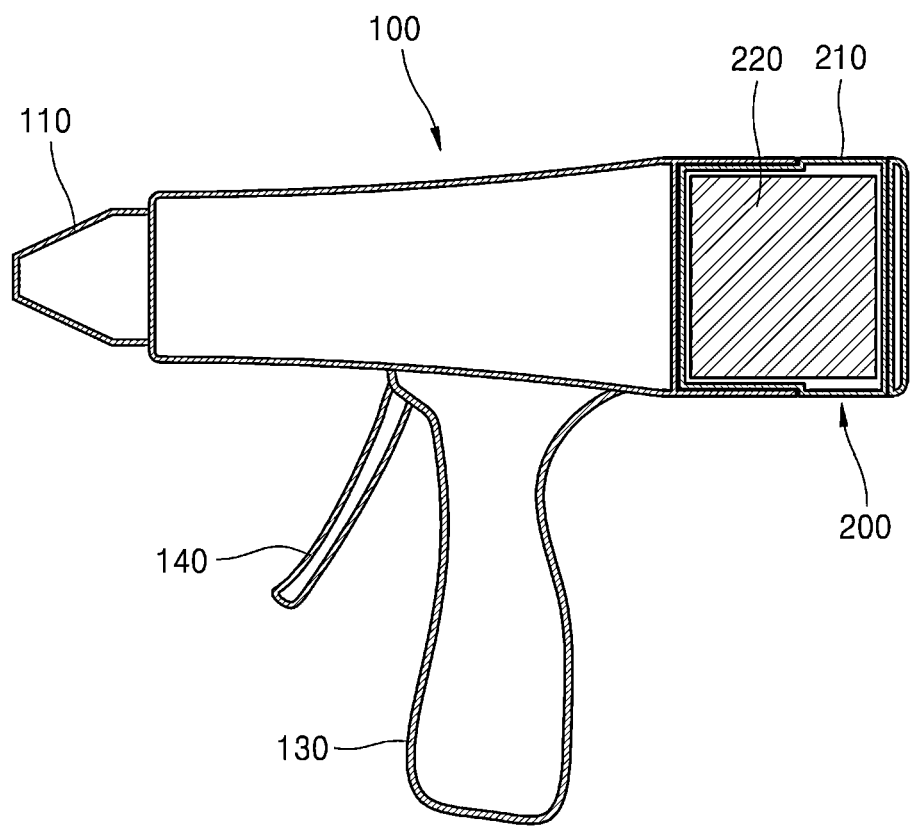
FIG. 3 is a cross-sectional view of FIG. 1.
Figure 4:
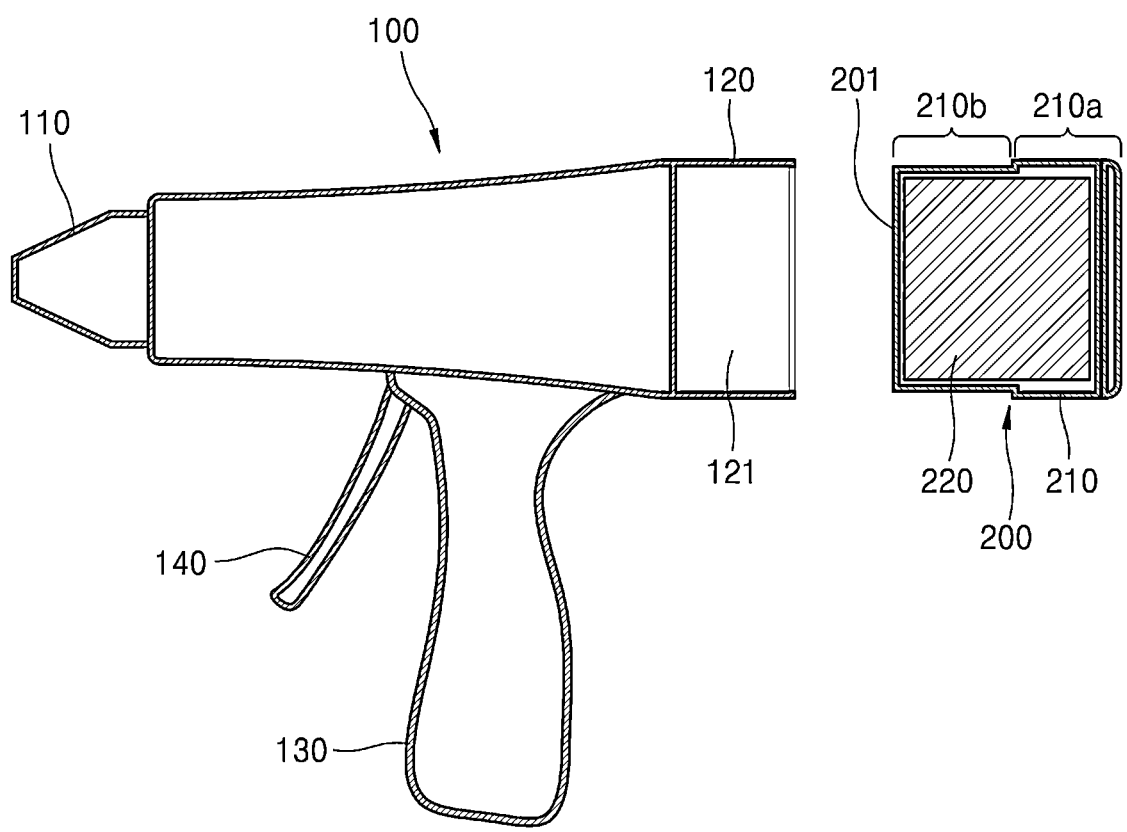
FIG. 4 is a cross-sectional view of FIG. 2.

FIG. 1 is a front view illustrating a manipulation part 100 and a driving unit 200 of a surgical instrument 10, according to an embodiment, and FIG. 2 is an exploded front view of the manipulation part 100 and the driving unit 200 of FIG. 1. FIG. 3 is a cross-sectional view of FIG. 1, and FIG. 4 is a cross-sectional view of FIG. 2.

Referring to FIGS. 1 to 4, the surgical instrument 10 according to an embodiment may include the manipulation part 100 and the driving unit 200.

The manipulation part 100 is provided as an interface to be directly controlled by a medical doctor, for example, a tongs shape, a stick shape, a lever shape, or the like, and when the medical doctor controls the manipulation part 100, an end tool (not shown), which is connected to the interface and inserted into the body of a surgical patient, performs a certain motion, thereby performing surgery. Here, the manipulation part 100 is illustrated as being formed in a shape that is provided with a handle 130 and a lever 140, but the concept of the disclosure is not limited thereto, and various types of manipulation parts that can be connected to the end tool (not shown) and manipulate the end tool (not shown) may be possible.

Meanwhile, an end tool connection part 110 connected to the end tool (not shown) may be formed at one end portion of the manipulation part 100, and the other end portion of the manipulation part 100 may include a coupling region 120 to which the driving unit 200 that supplies a driving force for the operation of the end tool (not shown) is detachably coupled.

The coupling region 120 may be formed in the form of a concave groove having a depth in one direction in one region of the outer surface of the manipulation part 100, and the coupling region 120 of the manipulation part 100 may include a coupling groove 121 formed to accommodate at least one region of the driving unit 200 in one direction. That is, when the driving unit 200 is coupled to the manipulation part 100, the driving unit 200 may be completely inserted into the manipulation part 100. However, in order to facilitate the attachment and detachment of the driving unit 200, only a portion of the driving unit 200 may be accommodated in and coupled to the coupling groove 121 of the manipulation part 100.

For example, referring back to FIG. 2, the driving unit 200 may be divided into a first region 210a that is accommodated in and coupled to the coupling region 120 of the manipulation part 100, and a second region 210b other than the first region 210a. That is, the first region 210a is a portion that is not inserted into the coupling groove 121, and may be easily gripped when the driving unit 200 is removed from the manipulation part 100.

The driving unit 200 may serve to supply power to the manipulation part 100 or transmit a driving force to the end tool (not shown). Meanwhile, when the surgical instrument 10 undergoes a sterilization process for reuse, internal components of the driving unit 200 are affected. In particular, when the internal components are batteries or motors, the risk of damage is high. Therefore, when the manipulation part 100, which is the main body of the surgical instrument 10, undergoes the sterilization process, and then, the driving unit 200 including a battery or the like is used by being assembled with the manipulation part 100 as a separate component, the risk of damage to the driving unit 200, such as the battery, may be minimized. The disclosure is intended to solve the above problems and is characterized by including the driving unit 200 that may be detachably coupled to the manipulation part 100.

The driving unit 200 may include a container 210 formed to be detachably attached to the manipulation part 100, and a battery pack 220 formed to be insertable into the container 210. Here, the container 210 is used in at least one procedure of surgery together with the surgical instrument and may be sterilized to ensure the safety of surgery. Hereinafter, for easier understanding of explanation, the sterilized container 210 is described as an example of the container 210. The sterilized container 210 is described in detail below.

Figure 5:
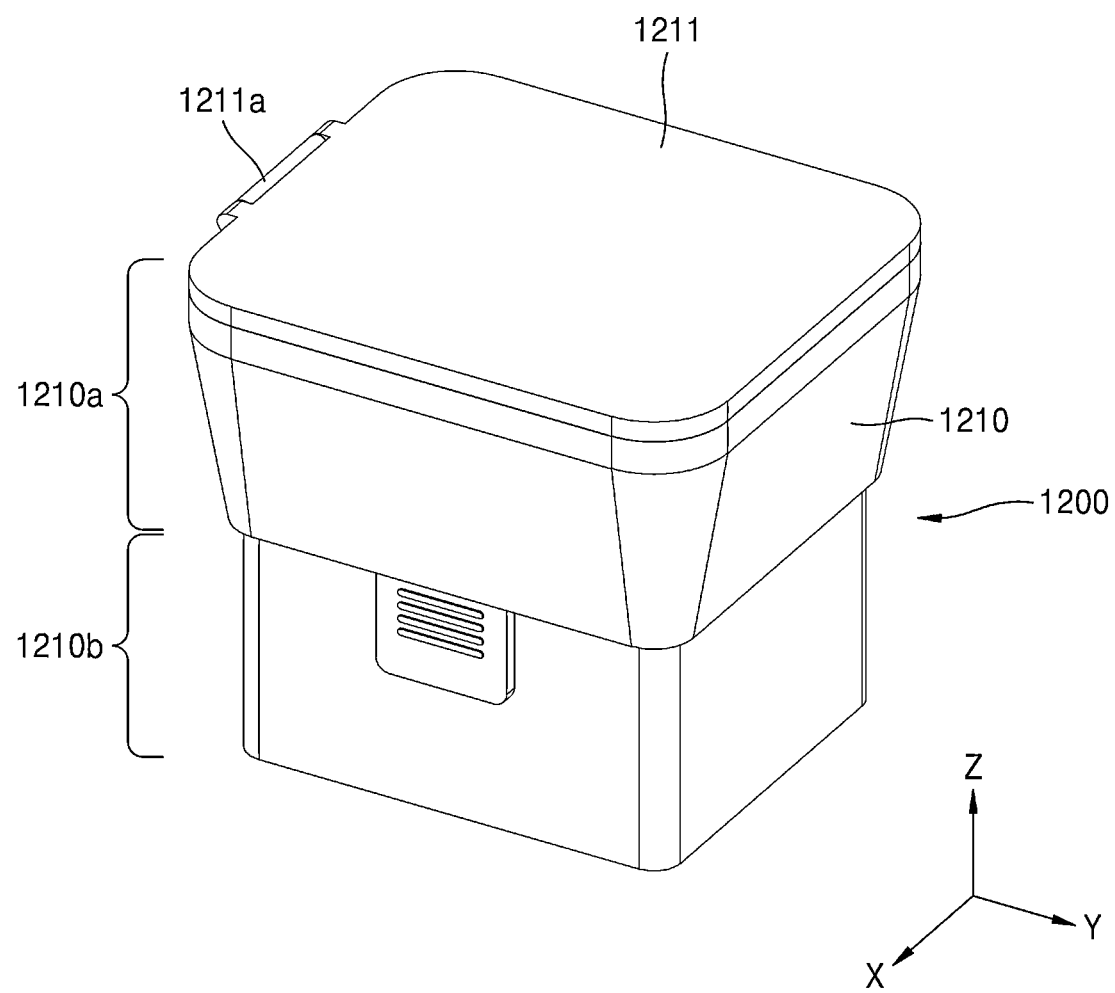
FIG. 5 is a perspective view illustrating an alternative embodiment of the driving unit of the surgical instrument of FIG. 1.
Figure 6:
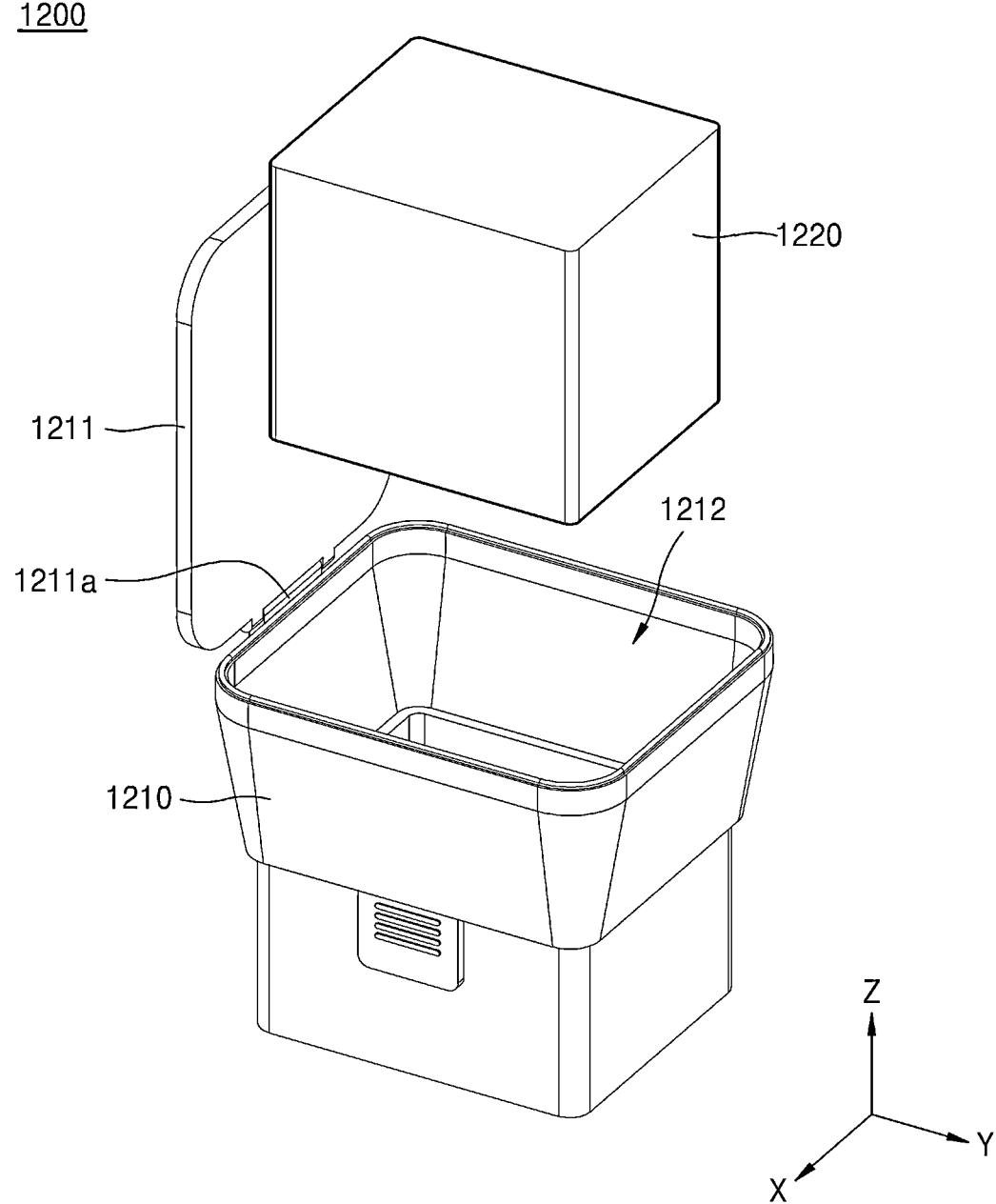
FIG. 6 is an exploded perspective view of a sterilized container and a battery pack of the driving unit of FIG. 5.
Figure 8D:
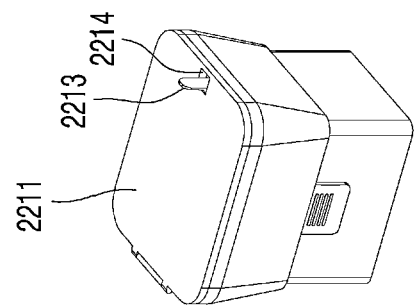
FIGS. 8A to 8D are perspective views illustrating a process of inserting the battery pack into the sterilized container and a locking structure of the sterilized container in FIGS. 7A to 7B.
Figure 8C:
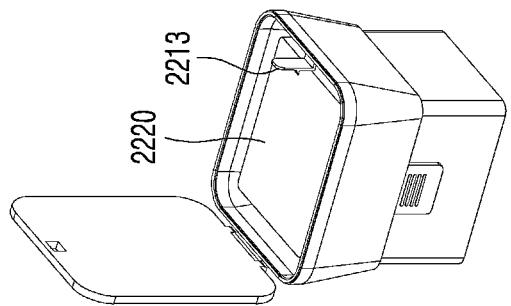
Figure 8B:
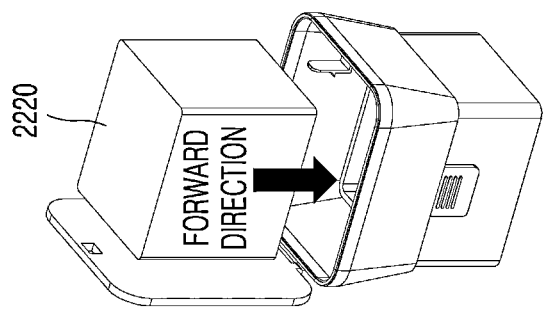
Figure 8A:
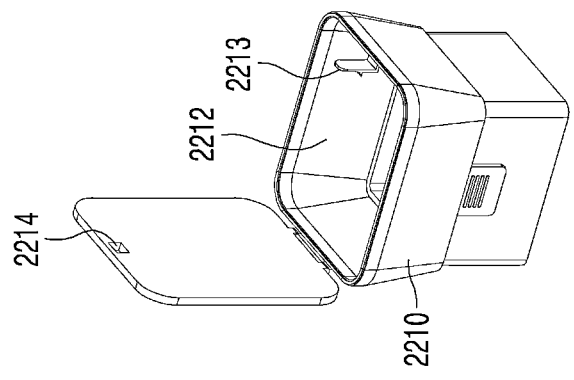

FIG. 5 is a perspective view illustrating an alternative embodiment of the driving unit 200 of the surgical instrument 10 of FIG. 1, and FIG. 6 is an exploded perspective view of a sterilized container 1210 and a battery pack 1220 of a driving unit 1200 of FIG. 5.

Referring to FIGS. 5 and 6, the sterilized container 1210 according to an embodiment may include an accommodation part 1212 that accommodates the battery pack 1220 and a cover part 1211 that closes the accommodation part 1212.

The accommodation part 1212 has a space in which the entire battery pack 1220 may be accommodated, and may be formed such that the battery pack 1220 does not protrude out of the accommodation part 1212 after the battery pack 1220 is completely inserted into the sterilized container 1210. However, the scope of the disclosure is not limited thereto. The cover part 1211 may be formed in a dome-like curved shape so that the upper end of the battery pack 1220 protrudes above the upper end of the accommodation part 1212 and the cover part 1211 accommodates the protruding portion of the battery pack 1220 as necessary.

The cover part 1211 may be opened or closed in a state in which one end portion of the body of the cover part 1211 is coupled to one end portion of the accommodation part 1212 of the sterilized container 1210. In other words, a hinge 1211a is formed at one end portion of the cover part 1211, such that the cover part 1211 rotates around the hinge 1211a and closes or opens the accommodation part 1212.

The sterilized container 1210 may have various shapes. Specifically, the sterilized container 1210 may have various shapes for inserting the battery pack 1220.

For example, when the sterilized container 1210 is divided into a first region 1210a close to an opening of the sterilized container 1210 and a second region 1210b adjacent to the first region 1210a, at least one region of the first region 1210a may have a width greater than that of the second region 1210b. Specifically, the width of the upper end of the first region 1210a, that is, the region close to the opening, may be greater than the width of the second region 1210b.

In an alternative embodiment, the first region 1210a may have a plurality of regions with different widths, and the width of the upper end of the first region 1210a may be greater than the width of the first region 1210a adjacent to the second region 1210b.

In addition, the sterilized container 1210 may have a shape that becomes narrower from the opening into which the battery pack 1220 is inserted to at least one inner region thereof. For example, the width of at least one region or the entire region of the first region 1210a may decrease toward the second region 1210b.

As a specific example, as illustrated in the drawings, the first region 1210a may be formed to have a width that decreases toward the second region 1210b. As an example, the first region 1210a may have an inclined inner surface.

Furthermore, the sterilized container 1210 may have a shape that becomes narrower from the opening into which the battery pack 1220 is inserted toward the lower end in all inner regions thereof. That is, when the direction from the upper end of the sterilized container 1210, to which the cover part 1211 is coupled, to the lower end of the sterilized container 1210, which is the bottom surface of the accommodation part 1212, is defined as a forward direction that is the insertion direction of the battery pack 1220, the sterilized container 1210 may be formed in a shape that becomes narrower in the forward direction. For example, the sterilized container 1210 may have a funnel shape, a conical shape, a trapezoidal shape, or the like. The concept of the disclosure is not limited thereto, and sterilized containers with various shapes that facilitate the insertion of battery packs may be used.

In the surgical instrument 10 according to an embodiment, when the battery pack 1220 is inserted into the sterilized container 1210, the width of an entrance of the accommodation part 1212 of the sterilized container 1210 is greater than the width of the battery pack 1220, and thus, the insertion of the battery pack 1220 may be facilitated. Due to the structure of the sterilized container 1210 that becomes narrower in the forward direction, the battery pack 1220 may be guided and mounted along the inclined side surface S of the sterilized container 1210, and the central portion of the battery pack 1220 may be naturally aligned toward the center of the sterilized container 1210. (See FIG. 7B)

Meanwhile, hospitals maintain operating rooms in a sterilized state so as to prevent infection in surgical patients, and require thorough management for sterilization treatment and sterilization maintenance of surgical instruments and medical personnel who perform surgery. Accordingly, it is an important issue to maintain the sterilized state of surgical instruments in the medical instrument industry, in particular, the surgical instrument industry.

Therefore, with regard to the use of surgical instruments, it is important to prevent the sterilized container from becoming contaminated in the process of inserting an unsterilized battery pack into the sterilized container. As described above, the sterilized container according to an embodiment adopts the structure that facilitates the insertion of the battery pack, thereby reducing the possibility of contamination due to a user's mistake. That is, the battery pack may be easily inserted into the sterilized container such that the outer surface of the sterilized container is not contaminated by the unsterilized battery pack.

FIGS. 7A to 7B is a perspective view and a cross-sectional view illustrating another alternative embodiment of the driving unit 200 of the surgical instrument 10 of FIG. 1. FIGS. 8A to 8D are perspective views illustrating a process of inserting a battery pack 2220 into a sterilized container 2210 of FIGS. 7A to 7B and a locking structure 2213 of the sterilized container 2210.

Referring to FIGS. 7A and 7B and FIGS. 8A to 8D, the sterilized container 2210 according to an embodiment may further include the locking structure 2213.

Specifically, a structure that protrudes toward a cover part 2211 may be formed on the upper side of the sterilized container 2210, and the cover part 2211 may have a locking groove 2214 formed at a position corresponding to the locking structure 2213 such that the locking groove 2214 is engageable with the locking structure 2213. Here, the locking structure 2213 and the locking groove 2214 are coupled to each other to prevent the cover part 2211 from being opened.

Furthermore, the locking structure 2213 may be damaged when an external force greater than a preset certain level is applied thereto. Specifically, the locking structure 2213 may be damaged when an external force greater than the weight of the battery pack 2220 is applied thereto. In detail, when an external force is applied in a direction in which the cover part 2211 is closed, the locking structure 2213 may be easily deformed, but when an external force is applied in a direction in which the cover part 2211 is opened, the locking structure 2213 may be damaged. In other words, the locking structure 2213 has a built-in structure that is easily foldable in the insertion direction (forward direction) of the battery pack 2220. In the reverse direction in which the battery pack 2220 is removed, when the closed cover part 2211 is opened, a certain opening and closing structure may be damaged and the cover part 2211 of the sterilized container 2210 may not be closed, making it impossible to reuse the sterilized container 2210. As such, since the locking structure 2213 is formed in an irreversible opening and closing structure, the sterilized container 2210 may be formed as a non-reusable disposable consumable. However, the concept of the disclosure is not limited thereto, and a sterilized container with a limited number of uses such that the sterilized container is usable only a certain number of times may be provided.

In addition, one or more locking structures 2213 may be provided, and the locking structure 2213 is not necessarily limited to being formed at the position illustrated in FIGS. 7A to 7B.

Meanwhile, another embodiment is described in relation to a device for preventing the reuse of the sterilized container 210.

Figure 9:
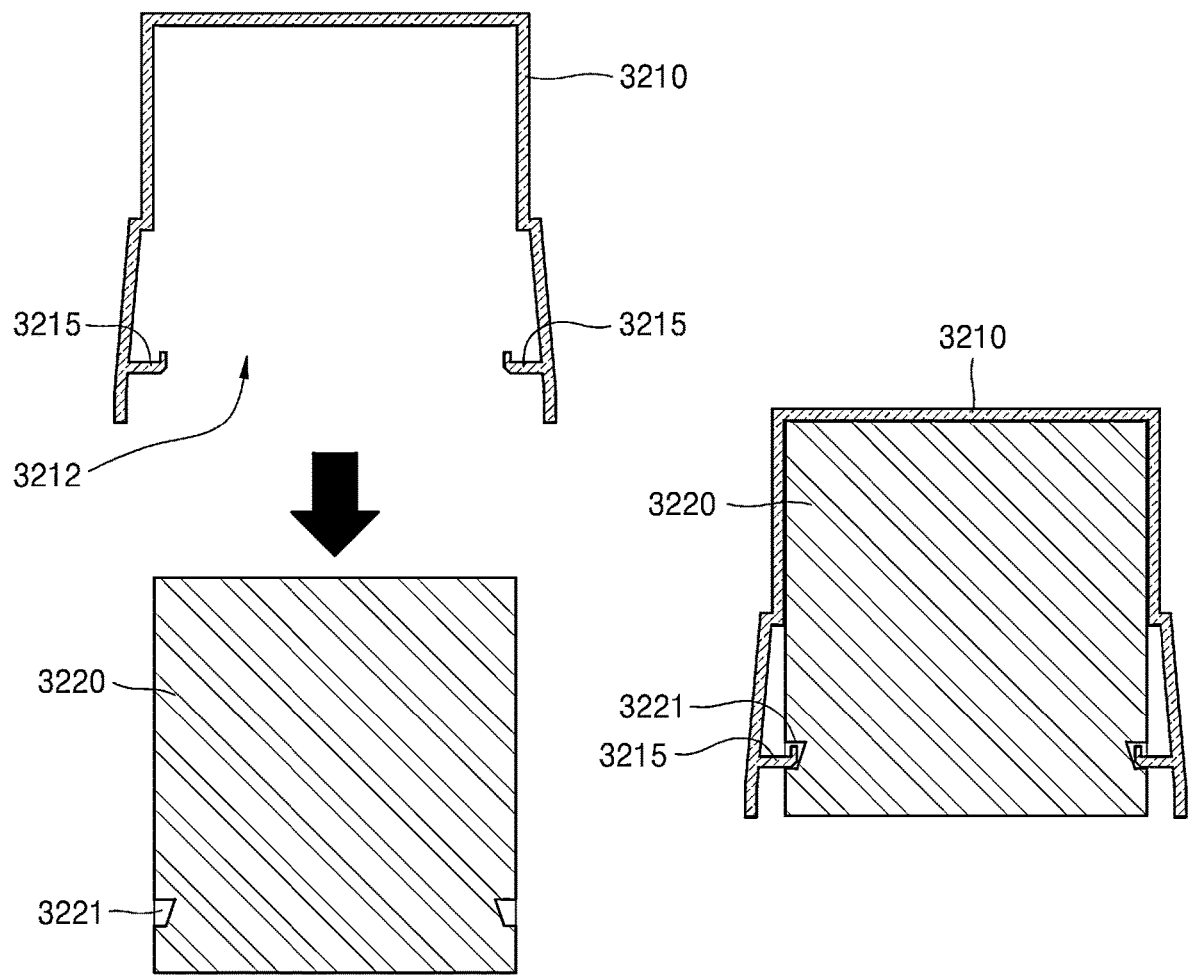
FIG. 9 is a cross-sectional view illustrating another alternative embodiment of the driving unit of the surgical instrument of FIG. 1.
Figure 10:
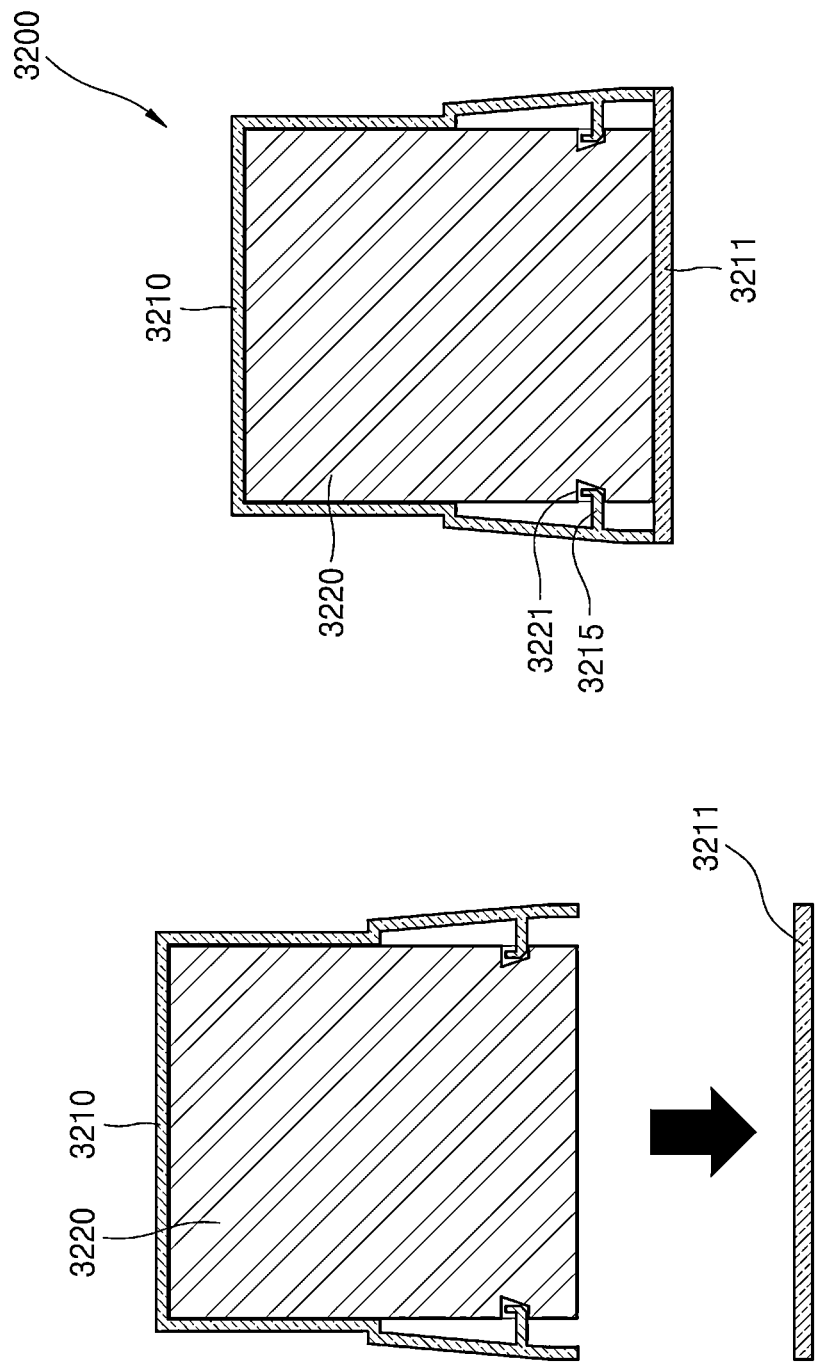
FIG. 10 is a cross-sectional view illustrating a process of coupling a cover part to a sterilized container of FIG. 9.

FIG. 9 is a cross-sectional view illustrating another alternative embodiment of the driving unit 200 of the surgical instrument 10 of FIG. 1. FIG. 10 is a cross-sectional view illustrating a process of coupling a cover part 3211 to a sterilized container 3210 of FIG. 9.

Referring to FIGS. 9 and 10, the sterilized container 3210 according to an embodiment may further include a coupling part 3215 that supports and fixes a battery pack 3220 inside an accommodation part 3212, and the battery pack 3220 may have a coupling groove 3221 formed at a position corresponding to the coupling part 3215.

The coupling part 3215 may be formed to protrude toward the inside of the accommodation part 3212. However, when the battery pack 3220 is inserted into the accommodation part 3212 of the sterilized container 3210, the coupling part 3215 of the sterilized container 3210 may be deformed to a certain extent due to elasticity. Accordingly, the battery pack 3220 may be easily inserted into the accommodation part 3212 without being caught in the coupling part 3215 when moving in the forward direction. Meanwhile, when the battery pack 3220 is sufficiently inserted into the accommodation part 3212 and the coupling part 3215 of the sterilized container 3210 is fitted into the coupling groove 3221 of the battery pack 3220, the battery pack 3220 is stably supported and fixed and is unmovable in the reverse direction.

In addition, the battery pack 3220 may have a structure in which the coupling groove 3221 is omitted. In this case, the coupling part 3215 is caught on the end portion of the battery pack 3220 in a state in which the battery pack 3220 is completely inserted into the sterilized container 3210, thereby supporting and fixing the battery pack 3220.

In addition, the coupling part 3215 may have a structure that is damaged when an external force greater than a preset condition, that is, a preset certain level, is applied thereto. Specifically, the coupling part 3215 may be damaged when an external force greater than the weight of the battery pack 3220 is applied thereto. In detail, the coupling part 3215 may be damaged when an external force is applied thereto in a direction opposite to the insertion direction of the battery pack 3220. In other words, a state in which the coupling part 3215 and the coupling groove 3221 are coupled to each other is a state in which the reverse movement of the battery pack 3220 is restricted. Unless there are special circumstances, an external force equivalent to the weight of the battery pack 3220 does not damage the coupling part 3215, but when an external force greater than the weight of the battery pack 3220 is applied to the coupling part 3215, the coupling part 3215 may be damaged and the battery pack 3220 may be withdrawn from the accommodation part 3212.

Since the sterilized container 3210 in which the coupling part 3215 is damaged does not stably support and fix the battery pack 3220, the sterilized container 3210 may no longer be used.

As such, since the coupling part 3215 is formed in an irreversible structure, the sterilized container 3210 may be formed as a non-reusable disposable consumable. However, the concept of the disclosure is not limited thereto, and a sterilized container with a limited number of uses such that the sterilized container is usable only a certain number of times may be provided.

Consequently, the reusable battery pack 220 is separated from the sterilized container 210 and recharged when surgery is completed, and the sterilized container 210 is separated and discarded separately.

Meanwhile, a method of inserting the unsterilized battery pack 220 into the sterilized container 210 includes a method using an automatic insertion-type charger and a direct coupling method. A charger for charging a battery pack will be described in detail later.

Figure 11:
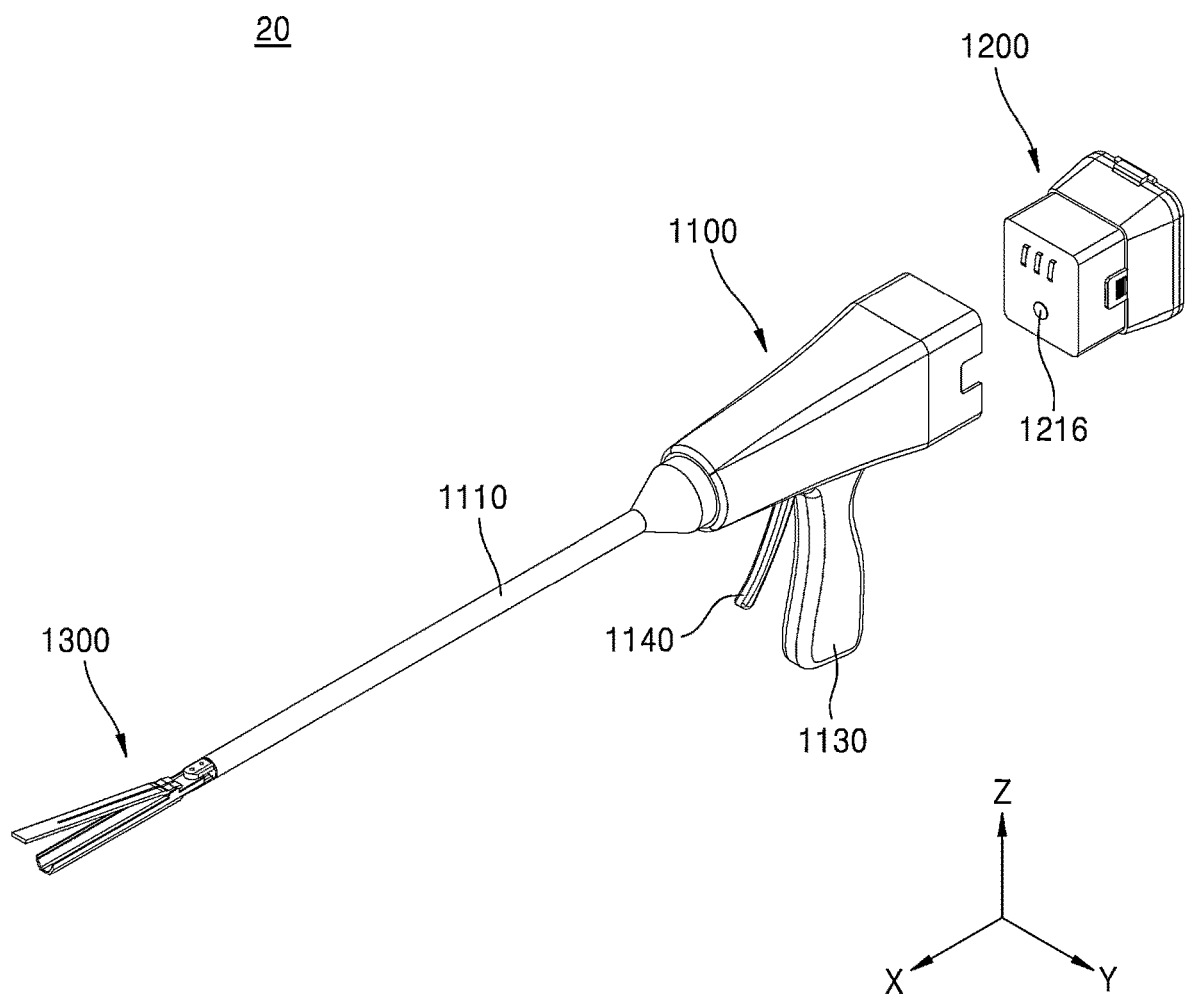
FIG. 11 is a perspective view illustrating a state in which a driving unit is separated in a surgical instrument according to an embodiment.

FIG. 11 is a perspective view illustrating a state in which the driving unit 200 is separated in the surgical instrument 20 according to an embodiment.

The surgical instrument 20 may include a manipulation part 1100, a driving unit 1200, an end tool connection part 1110, and an end tool 1300.

The end tool connection part 1110 is formed in the shape of a hollow shaft, and one or more wires and electric wires may be accommodated therein. The manipulation part 1100 is coupled to one end portion of the end tool connection part 1110, the end tool 1300 is coupled to the other end portion thereof, and the end tool connection part 1110 may serve to connect the manipulation part 1100 and the end tool 1300.

The end tool 1300 may be connected to one region (e.g., the end portion) of the surgical instrument 20 and inserted into a surgical site to perform motions necessary for surgery. In addition, in an example, the end tool 1300 may be connected to the manipulation part 1100. In a specific example, the end tool 1300 may be connected to the manipulation part 1100 through one or more connection parts 1110 and may be driven through the manipulation of the manipulation part 1100.

Although FIG. 11 illustrates that the end tool capable of performing a surgical stapler function is coupled, the disclosure is not limited thereto and various end tools may be coupled as the surgical instrument. A stapler end tool illustrated in FIG. 11 will be described in detail later.

Meanwhile, the driving unit 1200 of FIG. 5 is illustrated as the driving unit, but the disclosure is not limited thereto, and it is of course possible that the driving units of other embodiments described above may also be used.

Hereinafter, other features related to the sterilized container 1210 in the surgical instrument 20 according to an embodiment will be described in more detail.

The sterilized container 1210 may be made of a rigid polymer that maintains an opaque or transparent shape.

The sterilized container 1210 has an ID chip 1216 built inside or outside, and the manipulation part 1100 may include a recognition part that comes into contact with the ID chip 1216.

In an embodiment, when the manipulation part 1100 and the sterilized container 1210 are not completely physically coupled to each other through a certain physical contact structure provided between the manipulation part 1100 and the ID chip 1216 of the sterilized container 1210, the surgical instrument 20 prevents the manipulation part 1100 from coming into contact with the ID chip 1216, and thus, the system may not operate.

When the sterilized container 1210 is coupled to the manipulation part 1100, the ID chip 1216 comes into contact with the recognition part of the manipulation part 1100, and simultaneously, a preset system may operate. This means that system power On and status check begin at the same time as the insertion of the battery pack 1220 into the coupling region of the manipulation part 1100. For example, a product may be operated by the ID chip 1216 to provide a variety of information, such as product authentication, lot and serial number, and reuse or non-reuse.

In addition, the ID chip 1216 may transmit data to the manipulation part 1100 through passive radio frequency identification (RFID) technology that does not require power.

Figure 12:
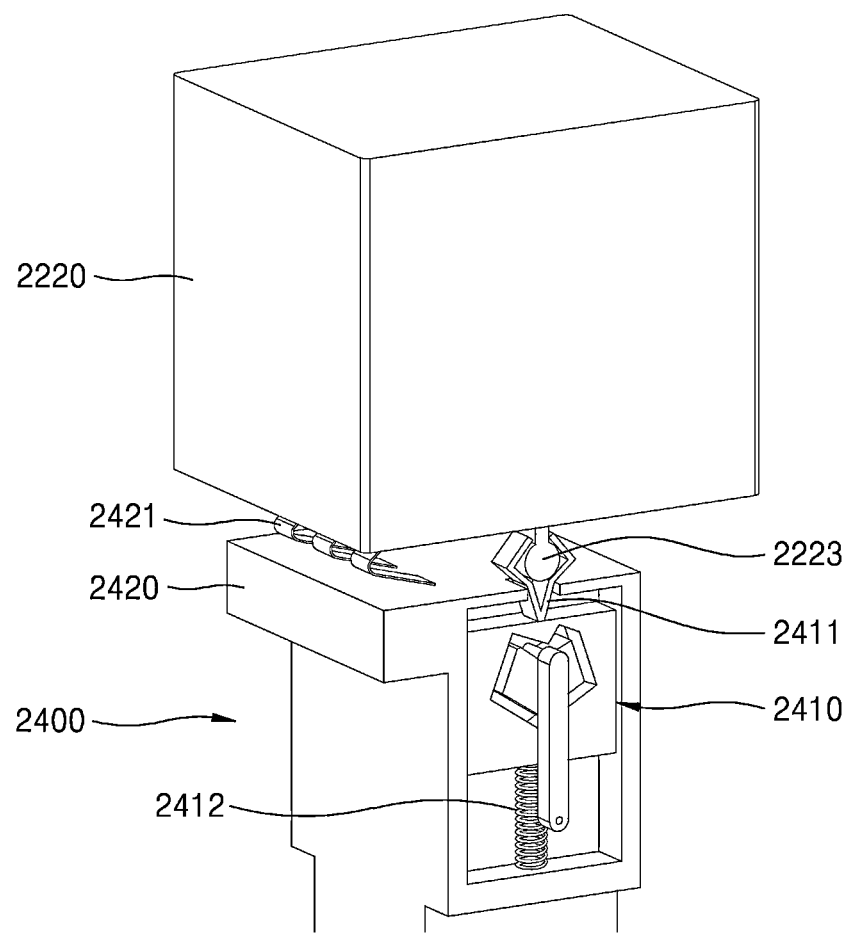
FIG. 12 is a perspective view illustrating a state of charging a battery pack of a surgical instrument according to an embodiment.
Figure 13:
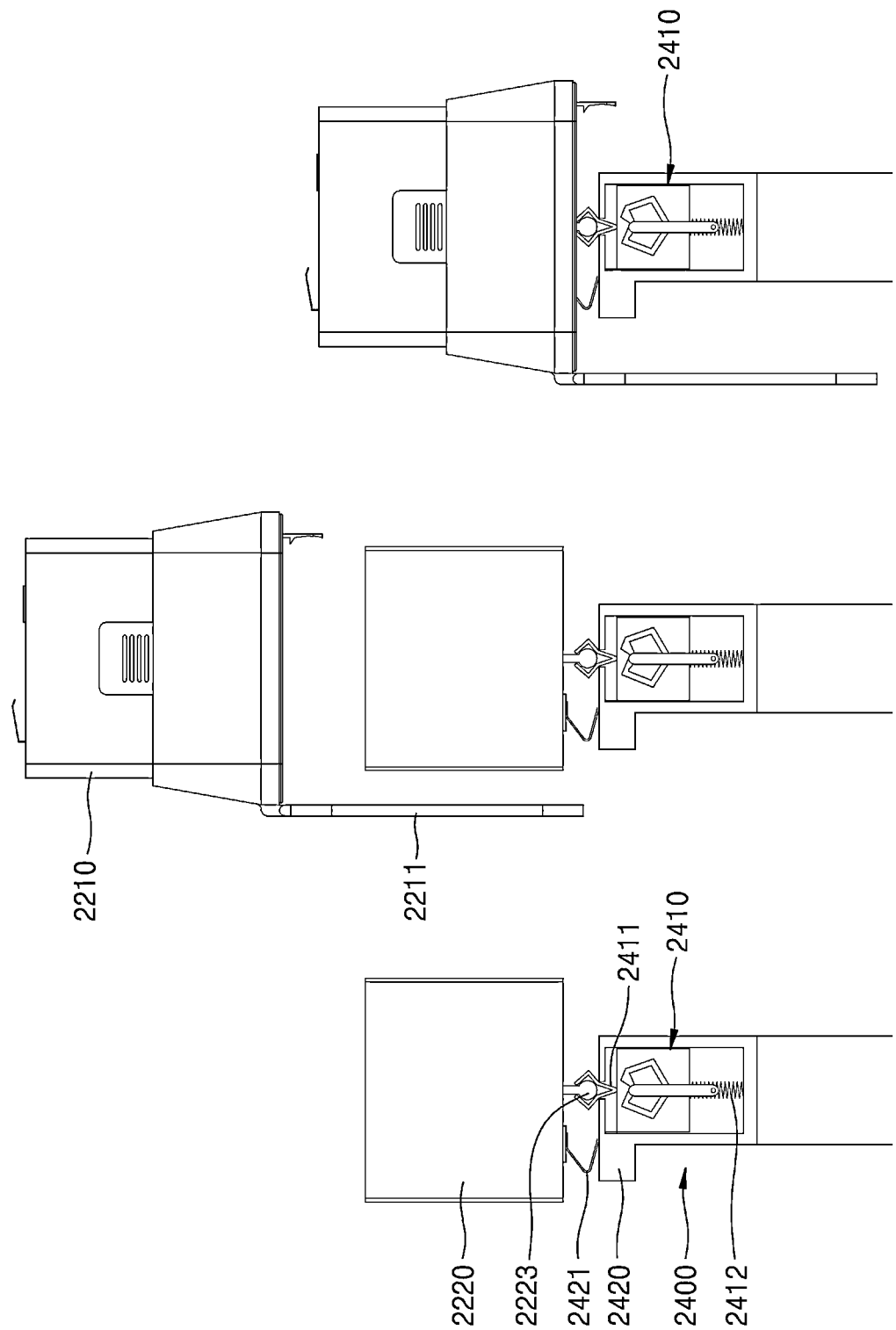
FIGS. 13A to 13C is a diagram illustrating a process of inserting the battery pack of FIG. 12 into a sterilized container.

FIG. 12 is a perspective view illustrating a state of charging the battery pack 220 of the surgical instrument 10 according to an embodiment, and FIGS. 13A to 13C is a diagram illustrating a process of inserting a battery pack 2220 of FIG. 12 into a sterilized container 2210 as a specific embodiment of FIG. 12.

An automatic insertion-type charger (hereinafter referred to as a charger) 2400 may include a charging device 2420 including a charger terminal 2421 that charges a battery by coming into contact with the charging terminal of the battery pack 2220, and a support 2410 that protrudes out of the charging device 2420 by a certain region and supports and fixes the battery pack 2220. Here, the support 2410 may be a structure that removes the battery pack 2220 when a certain pressure is applied thereto.

Specifically, the battery pack 2220 may include a protrusion 2223 protruding toward the charging device 2420, and the support 2410 may be a structure that includes a latch member 2411 that is pressed by the protrusion 2223 and engaged with or disengaged from the protrusion 2223, and an elastic member 2412 that presses the latch member 2411 in an outward direction from the inside of the charging device 2420. In other words, when the latch member 2411 provided in the charging device 2400 is pressed by the protrusion 2223 and moved inward, the latch member 2411 may grip the protrusion 2223, and thus, the battery pack 2220 may be charged while being fixed to the charging device 2420. In addition, when the latch member 2411 is pressed once more and moved, the latch member 2411 may be moved outward by the elastic member 2412. Accordingly, the protrusion 2223 gripped by the latch member 2411 may be released and the battery pack 2220 may be separated from the charging device 2420.

To explain this from a different point of view, after the sterilized container 2210 is arranged such that the battery pack 2220 held and fixed to the charging device 2420 is inserted into the sterilized container 2210 in the forward direction, the sterilized container 2210 is moved such that the battery pack 2220 is completely inserted into the sterilized container 2210. The battery pack 2220 may be automatically removed from the support 2410 by applying a certain pressure to the sterilized container 2210 in the forward direction in a state in which the battery pack 2220 is inserted thereinto.

In addition to the automatic insertion method, the direct coupling method may be a method of inserting the battery pack 2220 into the sterilized container 2210 and closing the cover part 2211 while holding a handle (not shown) provided on the fully charged battery pack 2220. At this time, a person in an unsterilized region may carry the battery pack 2220 and insert the battery pack 2220 into the sterilized container 2210 held by a person in a sterilized region.

Hereinafter, a surgical instrument 30 according to another embodiment will be described.

Figure 14:
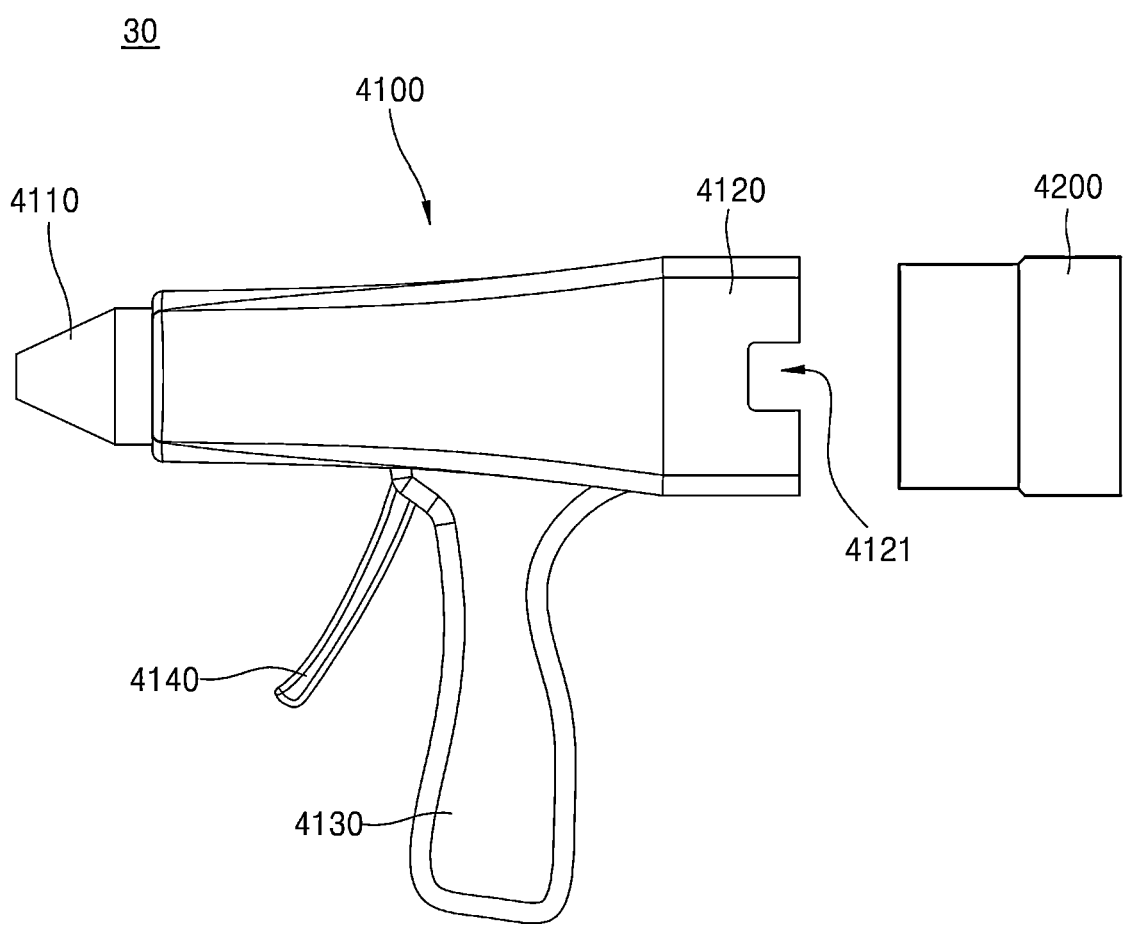
FIG. 14 is a diagram illustrating a surgical instrument according to another embodiment.

FIG. 14 is a diagram illustrating a surgical instrument 30 according to another embodiment.

Referring to FIG. 14, a driving unit 4200 may be a battery pack itself for supplying power to a manipulation part 4100.

That is, the driving unit 4200 may be a disposable battery pack itself, unlike the battery pack 220 inserted into the sterilized container 210.

When the disposable battery pack is provided, the battery pack is directly inserted into a coupling region 4120 or a coupling groove 4121 of the manipulation part 4100 that has been sterilized before surgery.

Like the reusable battery pack 220, an ID chip is built in the outside of the disposable battery pack. Accordingly, upon insertion into the manipulation part 4100, product authentication and number of uses may be recognized.

In an embodiment, when the manipulation part 4100 and the driving unit 4200 are not completely physically coupled to each other through a certain physical contact structure provided between the manipulation part 4100 and the ID chip of the driving unit 4200, the surgical instrument 30 prevents the manipulation part 4100 from coming into contact with the ID chip, and thus, the system may not operate.

When the driving unit 4200 is coupled to the manipulation part 4100, the ID chip comes into contact with a recognition part of the manipulation part 4100, and simultaneously, a preset system may operate. This means that system power On and status check begin at the same time as the insertion of the driving unit 4220 into the coupling region 4120 of the manipulation part 4100. For example, a product may be operated by the ID chip to provide a variety of information, such as product authentication, lot and serial number, and reuse or non-reuse.

The ID chip may transmit data to the manipulation part 4100 through passive RFID technology that does not require power.

Hereinafter, the end tool of the surgical instrument according to an embodiment will be described in detail.

Figure 15:
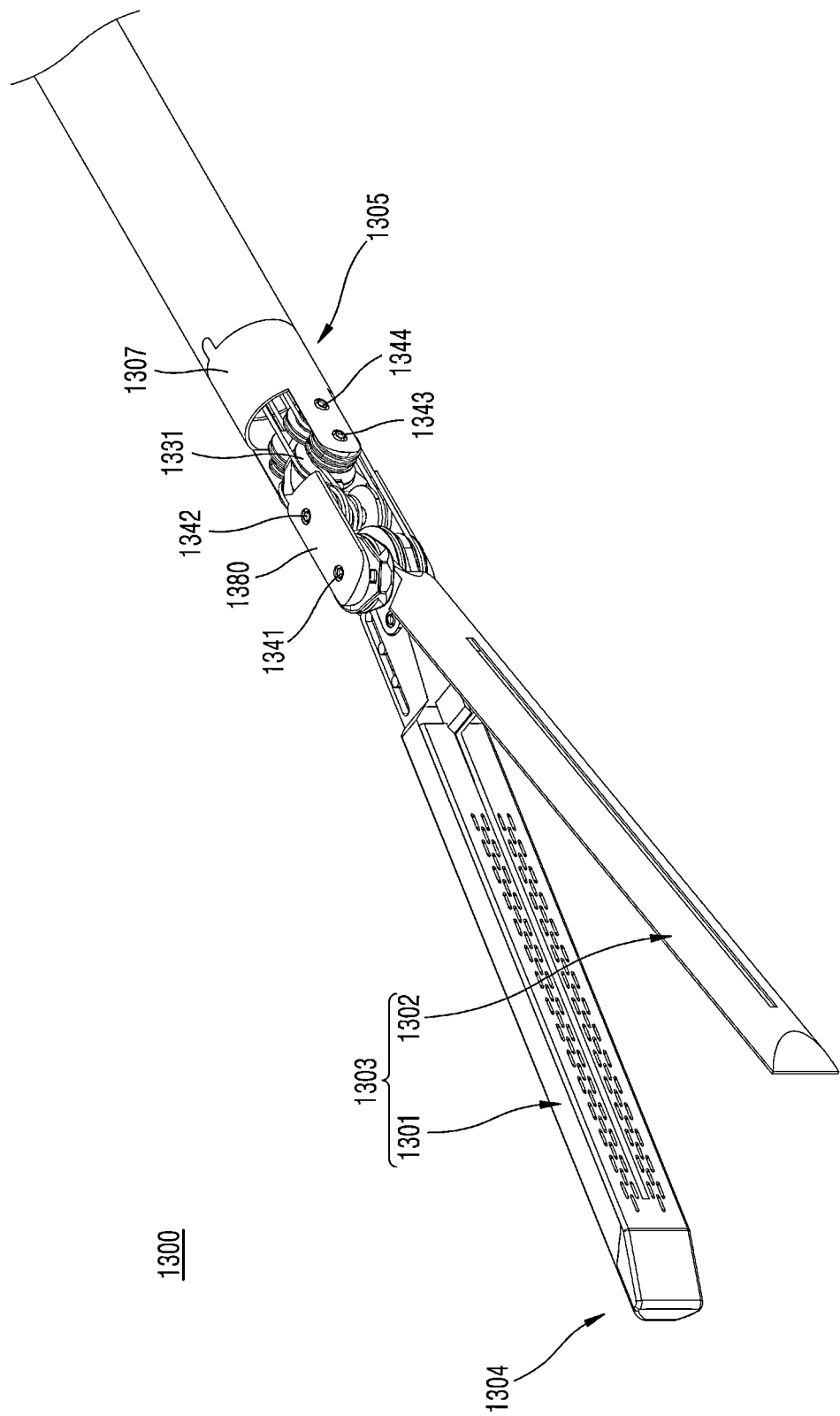
FIGS. 15 and 16 are perspective views illustrating an end tool of the surgical instrument of FIG. 11.
Figure 16:
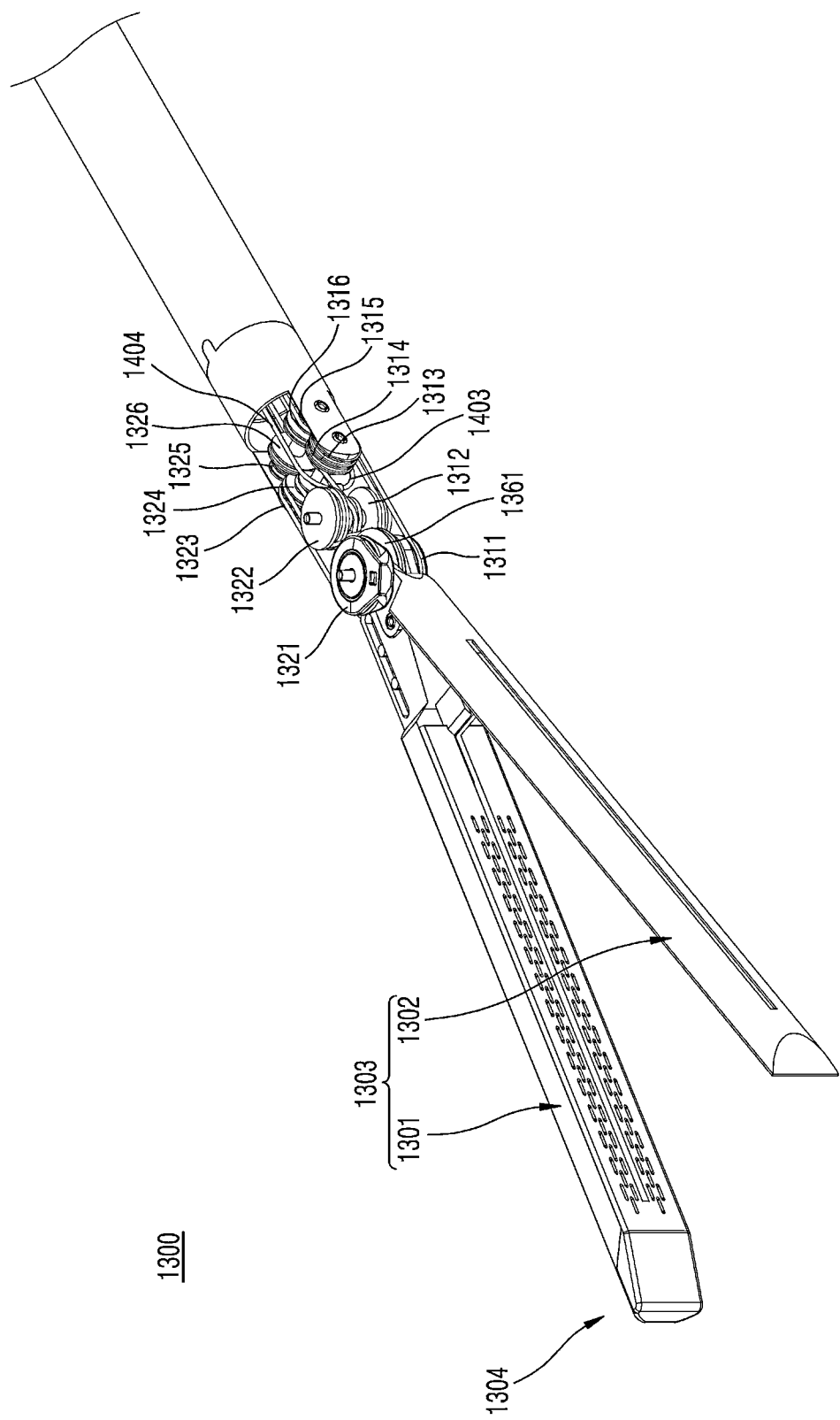
Figure 17:
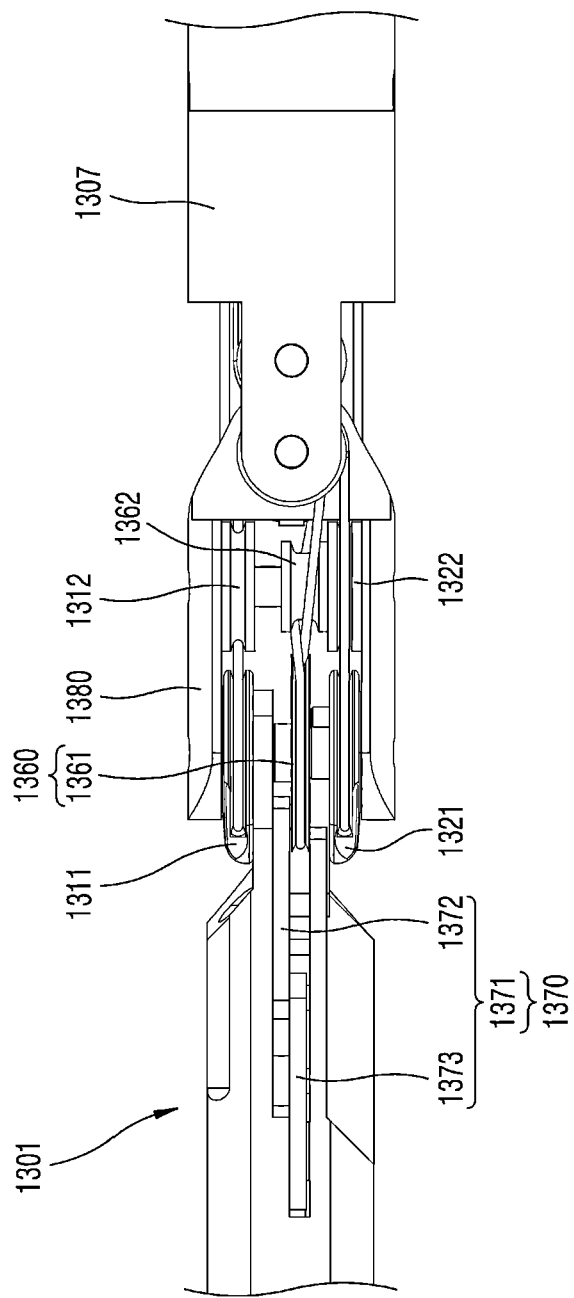
FIG. 17 is a side view illustrating the end tool of the surgical instrument of FIG. 11.
Figure 18:
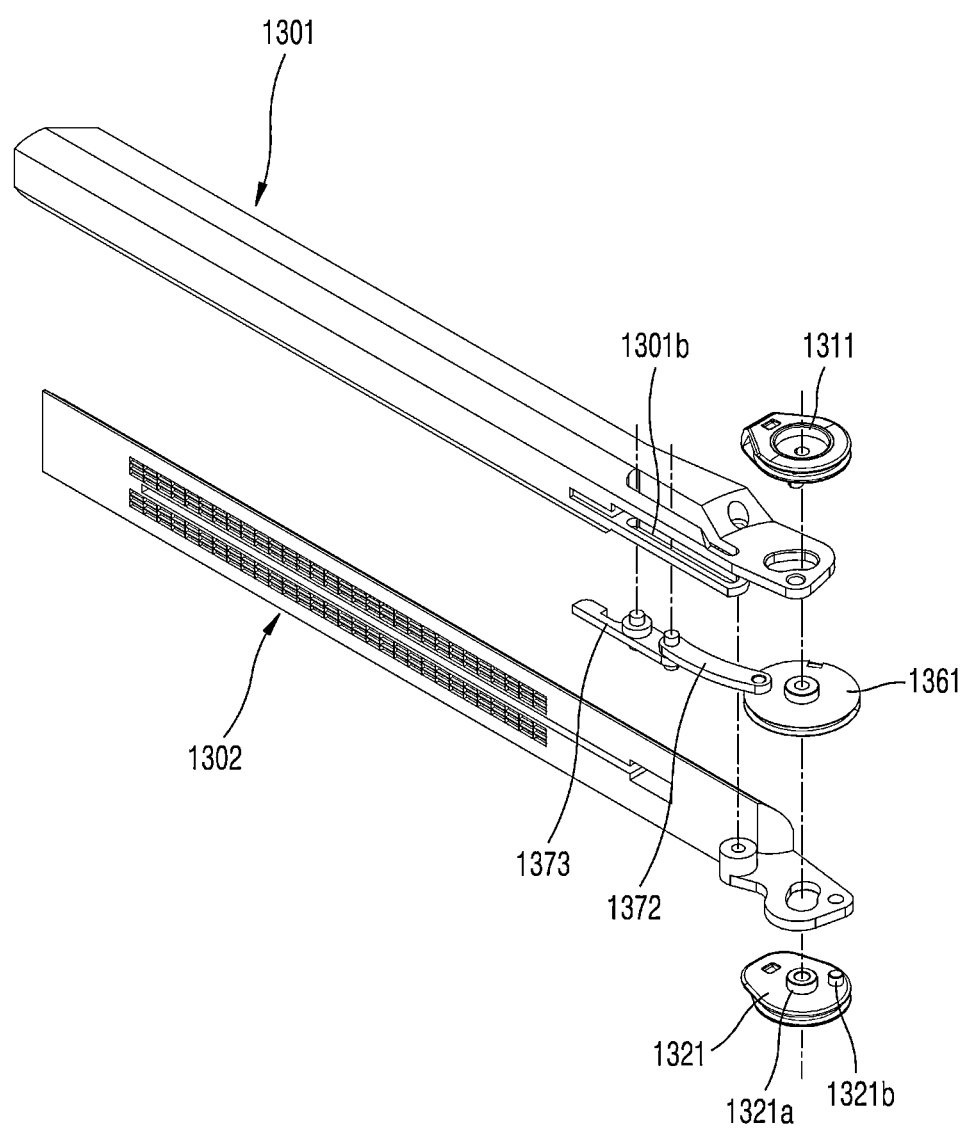
FIG. 18 is an exploded perspective view of the end tool of the surgical instrument of FIG. 11.

FIGS. 15 and 16 are perspective views illustrating the end tool of the surgical instrument of FIG. 11, and FIG. 17 is a side view illustrating the end tool of the surgical instrument of FIG. 11. FIG. 18 is an exploded perspective view of the end tool of the surgical instrument of FIG. 11.

The end tool 1300 is formed at the other end portion of the connection part 1110, and performs motions necessary for surgery by being inserted into a surgical site. As an example of the end tool 1300 described above, a pair of jaws 1303 for performing a grip motion may be used as illustrated in FIG. 11. However, the concept of the disclosure is not limited thereto, and various devices for performing surgery may be used as the end tool 1300. For example, a configuration of a cantilever cautery may also be used as the end tool 1300. The end tool 1300 is connected to the manipulation part 1100 by a power transmission part (not shown), and receives a driving force of the manipulation part 1100 through the power transmission part (not shown) to perform a motion necessary for surgery, such as gripping, cutting, suturing, or the like.

Here, the end tool 1300 of the surgical instrument 20 according to an embodiment is formed to be rotatable in one or more directions. For example, the end tool 1300 may be formed to perform a pitch motion around a Y-axis of FIG. 11 and simultaneously perform a yaw motion and an actuation motion around a Z-axis of FIG. 11.

The power transmission part (not shown) serves to connect the manipulation part 1100 to the end tool 1300 and transmit the driving force of the manipulation part 1100 to the end tool 1300, and may include a plurality of wires, pulleys, links, sections, gears, or the like.

In addition, the end tool 1300 may include a pulley 1311, a pulley 1312, a pulley 1313, a pulley 1314, a pulley 1315, and a pulley 1316 that are related to a rotational motion of a first jaw 1301. In addition, the end tool 1300 may include a pulley 1321, a pulley 1322, a pulley 1323, a pulley 1324, a pulley 1325, and a pulley 1326 that are related to a rotational motion of a second jaw 1302.

Although it is illustrated in the drawings that the facing pulleys are formed parallel to each other, the concept of the disclosure is not limited thereto, and the respective pulleys may be formed in various positions and sizes suitable for the configuration of the end tool.

In addition, the end tool 1300 of the first embodiment may include an end tool hub 1380 and a pitch hub 1307.

A rotation shaft 1341 and a rotation shaft 1342, which will be described later, may be inserted through the end tool hub 1380, and the end tool hub 1380 may internally accommodate at least some of the pulley 1311 and the pulley 1321 axially coupled to the rotation shaft 1341. Further, the end tool hub 1380 may internally accommodate at least some of the pulley 1312 and the pulley 1322 that are axially coupled to the rotation shaft 1342.

Meanwhile, a pulley 1331 serving as an end tool pitch pulley may be formed at one end portion of the end tool hub 1380. As illustrated in FIG. 15, the pulley 1331 may be integrally formed with the end tool hub 1380. That is, a pulley may be formed at one end portion of the end tool hub 1380 in the shape of a disk, and a groove around which a wire is wound may be formed on an outer circumferential surface of the pulley. Alternatively, the pulley 1331 may be formed as a separate member from the end tool hub 1380 and may be coupled to the end tool hub 1380. A wire 1403 and a wire 1404 are coupled to the pulley 1331 serving as an end tool pitch pulley, and the pulley 1331 rotates around a rotation shaft 1343 to perform a pitch motion.

The rotation shaft 1343 and a rotation shaft 1344, which will be described later, may be inserted through the pitch hub 1307, and the pitch hub 1307 may be axially coupled to the end tool hub 1380 (and the pulley 1331) by the rotation shaft 1343. Accordingly, the end tool hub 1380 and the pulley 1331 may be formed to be rotatable around the rotation shaft 1343 with respect to the pitch hub 1307.

The pulley 1311 and the pulley 1321, which are end tool jaw pulleys, are formed to face each other and are formed to be independently rotatable around the rotation shaft 1341, which is an end tool jaw pulley rotation shaft. At this time, the pulley 1311 and the pulley 1321 may be formed to be spaced apart from each other to a certain extent, and a staple assembly accommodation part may be formed therebetween. At least a portion of a staple pulley assembly 1360 and a staple link assembly 1370, which will be described later, may be disposed in the staple assembly accommodation part.

The first jaw 1301 is formed in the shape of an elongated bar as a whole, and a cartridge 1500 is accommodated in the first jaw 1301 at a distal end side. The pulley 1311 is coupled to a proximal end of the first jaw 1301, so that the first jaw 1301 is formed to be rotatable around the rotation shaft 1341. In other words, the first jaw 1301 may be formed entirely in the form of a hollow box, of which one surface (upper surface) is removed, such that the cartridge accommodation part capable of accommodating the cartridge 1500 may be formed inside the first jaw 1301. That is, the first jaw 1301 may be formed in an approximately "U" shape in cross section. The cartridge will be described in detail later.

Referring to FIGS. 15 to 18 and the like, the end tool 1300 may include a staple pulley 1361 and a staple auxiliary pulley 1362 related to a linear motion/rotational motion of the respective pulleys and links for stapling and cutting.

The staple pulley 1361 is formed to face the pulley 1311 and the pulley 1321, which are end tool jaw pulleys, and is formed to be independently rotatable around the rotation shaft 1341, which is an end tool jaw pulley rotation shaft. Here, it is illustrated in the drawings that the staple pulley 1361 is disposed between the pulley 1311 and the pulley 1321, but the concept of the disclosure is not limited thereto, and the staple pulley 1361 may be disposed at various positions adjacent to the pulley 1311 or the pulley 1321.

Here, the staple pulley 1361, the pulley 1311, and the pulley 1321 are formed to rotate around substantially the same shaft. As such, by forming the staple pulley 1361, the pulley 1311, and the pulley 1321 to rotate around the same shaft, it is possible to perform a pitch motion/yaw motion/actuation motion while also performing stapling and cutting motions. However, although the staple pulley 1361, the pulley 1311, and the pulley 1321 are illustrated in the drawings as being formed to rotate around one rotation shaft 1341, it is of course possible that each jaw pulley may be formed to be rotatable around a separate shaft that is concentric therewith.

Meanwhile, the end tool 1300 of the first embodiment may further include the staple link assembly 1370 connected to the staple pulley assembly 1360. The staple link assembly 1370 may include one or more link members 1371. The staple link assembly 1370 may serve to connect the staple pulley assembly 1360 to a reciprocating assembly 1550 of a cartridge 1500, which will be described later. In the present embodiment, it is assumed that the staple link assembly 1370 includes one link member 1371, and the link member 1371 includes a first link 1372 and a second link 1373.

When the staple pulley 1361 is rotated in the clockwise direction, the link member 1371 connected to the staple pulley 1361 may be moved toward the distal end of the first jaw 1301 as a whole. In contrast, when the staple pulley 1361 is rotated in the counterclockwise direction, the link member 1371 connected to the staple pulley 1361 may be moved toward the proximal end of the first jaw 1301 as a whole.

Thus, a bidirectional rotational motion of the staple pulley assembly 1360 causes a reciprocating linear motion of the reciprocating assembly 1550 of the cartridge 1500 through the staple link assembly 1370.

The cartridge 1500 of the surgical instrument 20 of FIG. 11 will be described in more detail below.

Figure 19:
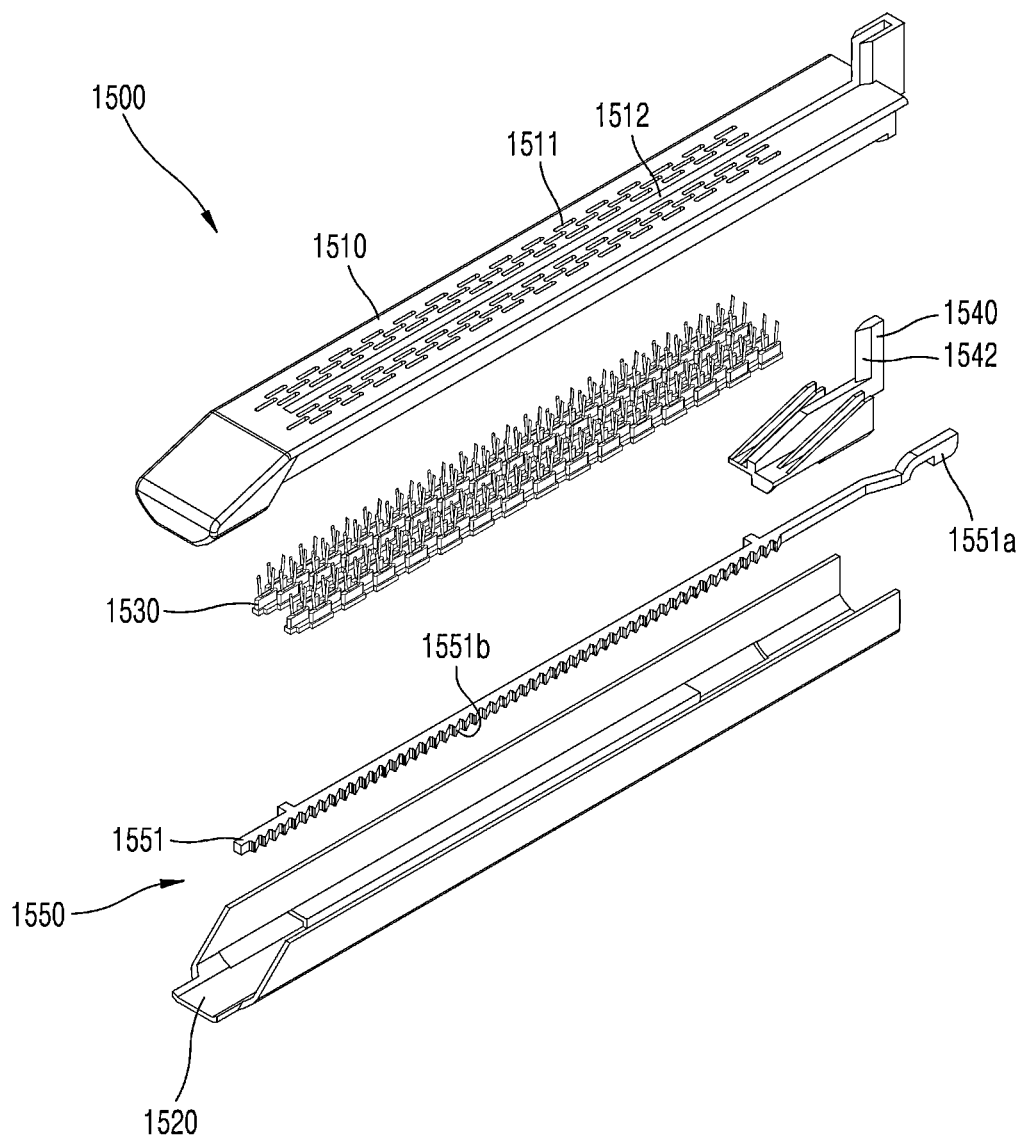
FIG. 19 is an exploded perspective view illustrating a cartridge of FIG. 15.
Figure 20:
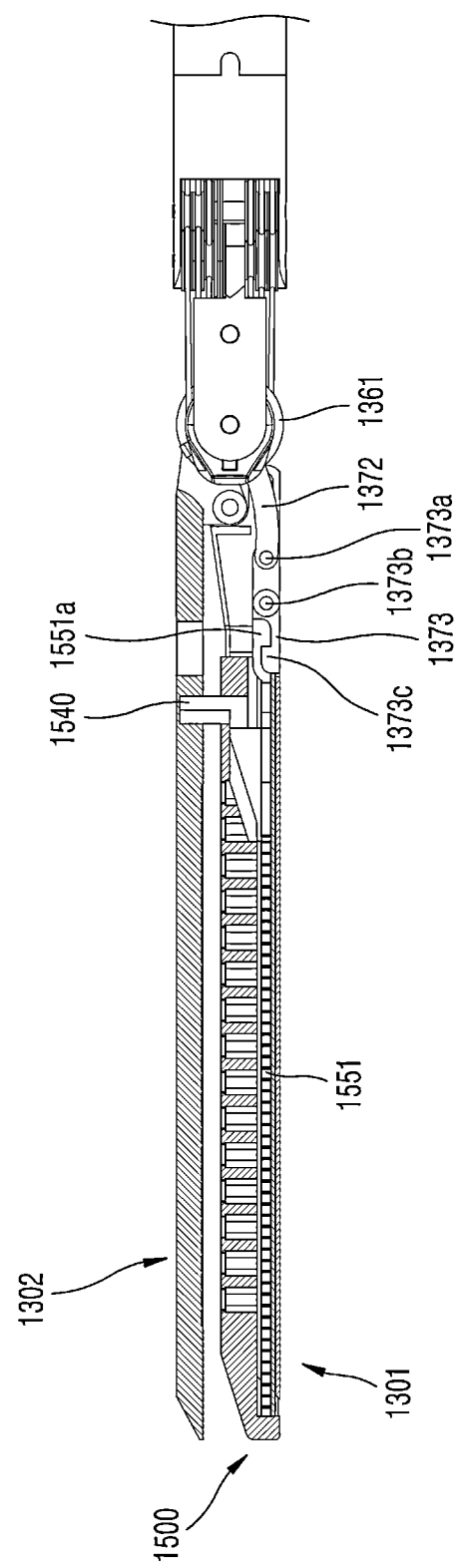
FIG. 20 is a side cross-sectional view illustrating a stapling-related structure of the end tool of the surgical instrument of FIG. 11.
Figure 21:
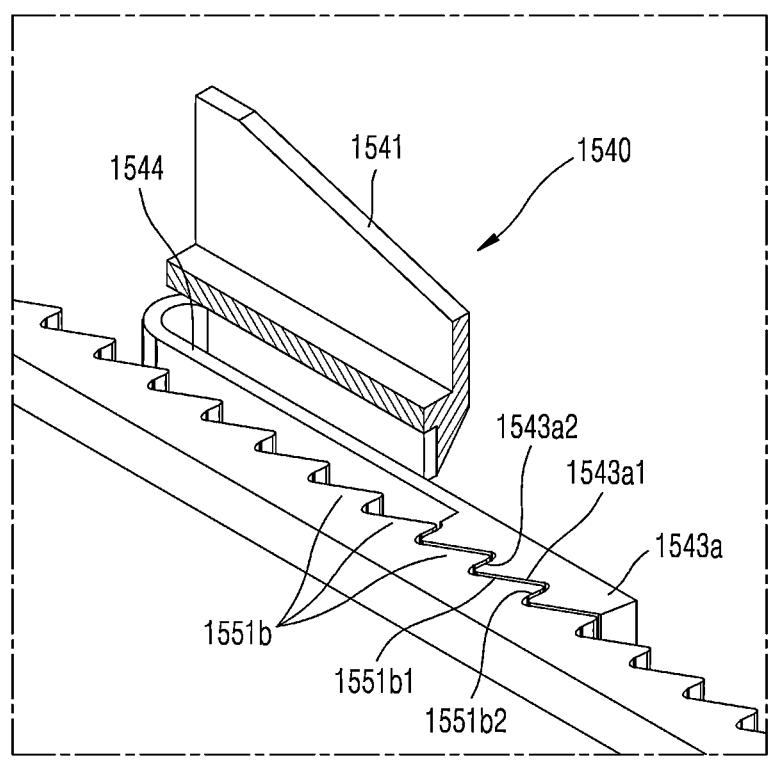
FIG. 21 is a perspective view illustrating a ratchet drive motion of the end tool of FIG. 20.

FIG. 19 is an exploded perspective view illustrating the cartridge of FIG. 15, FIG. 20 is a side cross-sectional view illustrating a stapling-related structure of the end tool of the surgical instrument of FIG. 11, and FIG. 21 is a perspective view illustrating a ratchet drive motion of the end tool of FIG. 20.

The cartridge 1500 is formed to be mountable to and dismountable from a first jaw 1301, and includes a plurality of staples 1530 and a blade 1542 therein to perform suturing and cutting of tissue. Here, the cartridge 1500 may include a cover 1510, a housing 1520, a staple 1530, a withdrawal member 1535, an operation member 1540, and a reciprocating assembly 1550.

The housing 1520 forms an outer shape of the cartridge 1500, and may be formed entirely in the form of a hollow box, of which one surface (upper surface) is removed, and formed to accommodate the reciprocating assembly 1550, the operation member 1540, and the staple 1530 therein.

The cover 1510 is formed to cover an upper portion of the housing 1520. Staple holes 1511 through which the staples 1530 may be ejected to the outside may be formed in the cover 1510. As the staples 1530, which are accommodated inside the housing 1520 before a stapling motion, are pushed and raised upward by the operation member 1540 during a stapling motion and pass through the staple holes 1511 of the cover 1510 to be withdrawn to the outside of the cartridge 1500, stapling is performed.

Meanwhile, a slit 1512 may be formed in the cover 1510 along a length direction of the cover 1510. The blade 1542 of the operation member 1540 may protrude out of the cartridge 1500 through the slit 1512. As the blade 1542 of the operation member 1540 passes along the slit 1512, staple-completed tissue may be cut.

In addition, the staples 1530 may be disposed inside the housing 1520. As the operation member 1540, which will be described later, is linearly moved in one direction, the staples 1530 are sequentially pushed and raised from the inside of the housing 1520 to the outside, thereby performing suturing, that is, stapling. Here, the staples 1530 may be made of a material that may include titanium, stainless steel, or the like.

Meanwhile, the withdrawal member 1535 may be further disposed between the housing 1520 and the staple 1530. In other words, it may be said that the staple 1530 is disposed above the withdrawal member 1535. In this case, the operation member 1540 is linearly moved in one direction to push and raise the withdrawal member 1535, and the withdrawal member 1535 may push and raise the staple 1530.

The reciprocating assembly 1550 may be disposed at an inner lower side of the housing 1520. The reciprocating assembly 1550 may include one or more reciprocating members 1551. In the present embodiment, it is illustrated that one reciprocating member 1551 is provided, but in embodiments to be described later, a plurality of reciprocating members 1551 may be provided.

In the present embodiment, the reciprocating member 1551 may be a rack. The reciprocating member 1551 may include recesses 1551*b* and a coupling part 1551*a*. In detail, the reciprocating member 1551 may be formed in the form of an elongated bar, and a plurality of recesses 1551*b* having a sawtooth shape may be formed on one surface thereof. The recess 1551*b* may be formed to be in contact with the operation member 1540 to be described later, in particular, a ratchet member 1543 of the operation member 1540. In other words, the reciprocating member 1551 may include the plurality of recesses 1551*b* shaped to engage with ratchets 1543*a* of the ratchet member 1543.

Meanwhile, although not shown in the drawings, in addition to a rack shape, the reciprocating member 1551 may be provided as various shapes of members, which are directly or indirectly connected to the staple pulley assembly 1360 and may perform a linear reciprocating motion according to a rotational motion of the staple pulley assembly 1360. For example, the reciprocating member 1551 may be in the form of a clutch in which recesses are not present.

Meanwhile, the operation member 1540 may be disposed inside the housing 1520. The operation member 1540 is formed to be in contact with the reciprocating member 1551, and may be formed to linearly move in one direction according to the reciprocating linear motion of the reciprocating member 1551. In other words, the operation member 1540 interacts with the reciprocating member 1551 to perform stapling and cutting while moving in the extension direction of the connection part 1100.

Hereinafter, a stapling motion of the surgical instrument according to an embodiment will be described.

Figure 22A:
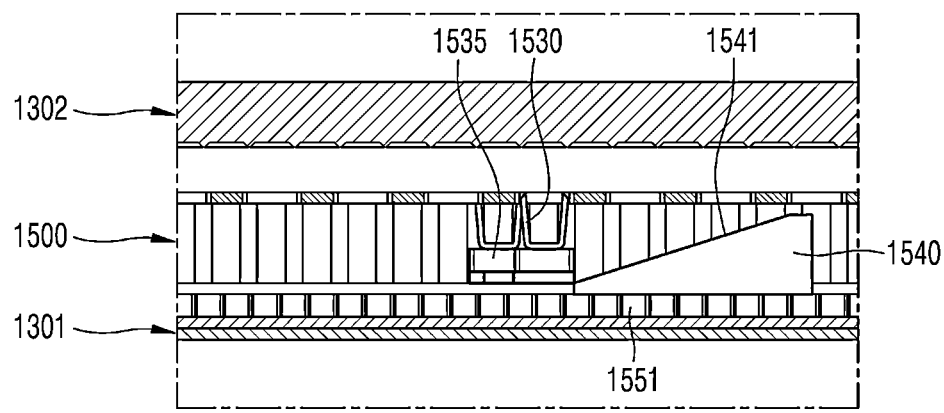
FIGS. 22A to 22C is a perspective view illustrating a stapling motion of the end tool of FIG. 20.
Figure 22B:
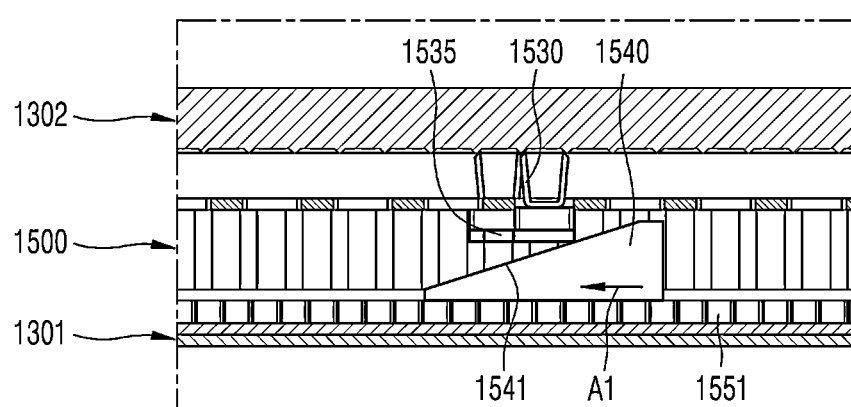
Figure 22C:
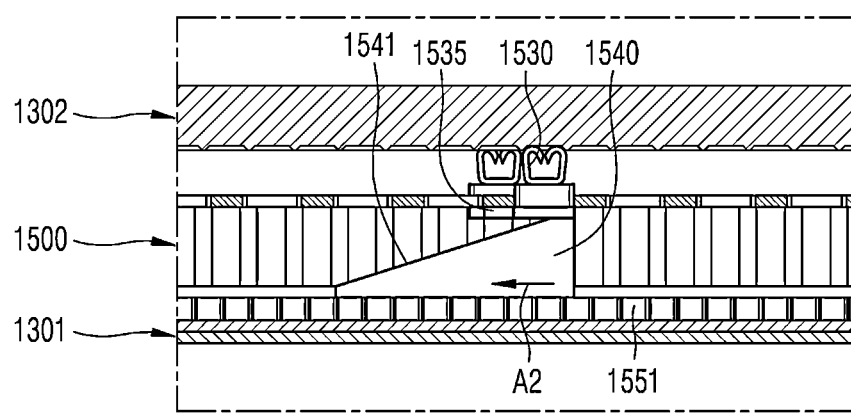

FIGS. 22A to 22C is a perspective view illustrating a stapling motion of the end tool of FIG. 20.

Referring to FIGS. 22A to 22C, in the state as shown in FIG. 22A, as the operation member 1540 is moved in the direction of an arrow A1 of FIG. 22B, the wedge 1541 of the operation member 1540 pushes and raises the withdrawal member 1535, and the withdrawal member 1535 pushes and raises one side of a lower portion of the staple 1530. In addition, due thereto, the staple 1530 is ejected to the outside of the first jaw 1301 and the cartridge 1500.

In this state, when the operation member 1540 is further moved in the direction of an arrow A2 of FIG. 22C, the ejected staple 1530 is continuously pushed and raised by the operation member 1540 while in contact with the anvil 1302a of the second jaw 1302, so that stapling is performed while both end portions of the staple 1530 are bent.

As such motions are continuously performed, stapling is sequentially performed from the staple 1530 at the proximal end 1501 side to the staple 1530 at the distal end 1502 side among the plurality of staples 1530.

A surgical instrument undergoes a sterilization process, and in the case of a conventional reusable electric handheld instrument, an entire handle was covered with a soft or hard polymer case so as to avoid the risk of damage to internal components (in particular, a battery) during a surgical sterilization process. Due thereto, there were problems causing inconvenience in terms of intuitive function selection (button utilization) and usability.

The disclosure is intended to solve the above problems and limitations, and provides a surgical instrument that minimizes the risk of battery damage when a reusable handle (manipulation part) is sterilized by applying a disposable battery sterilized container or a disposable battery pack for the use of an electric handheld instrument, and improves product durability, user convenience, and the like.

According to the technical solution of the disclosure described above, the surgical instruments according to the embodiments may minimize the risk of battery damage when the reusable handle (manipulation part) is sterilized, and may improve product durability and user convenience.

The disclosure has been described with reference to preferred embodiments. Those of ordinary skill in the art will understand that the disclosure may be implemented in modified forms without departing from the essential features of the disclosure. Therefore, the disclosed embodiments should be considered in an illustrative sense rather than a restrictive sense. The scope of the disclosure is indicated in the claims rather than the foregoing description, and all differences within the scope equivalent thereto should be construed as falling within the disclosure.

According to the technical solution of the disclosure described above, the surgical instruments according to the embodiments may improve product durability and user convenience.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A surgical instrument comprising:
a manipulation assembly configured to be coupled to a connection part of an end tool, wherein the manipulation assembly is configured to control an operation of the end tool; and
a driving assembly detachably coupled to the manipulation assembly, wherein the driving assembly supplies a driving force for the operation of the end tool through the manipulation assembly,
wherein the driving assembly comprises:
a container detachably coupled to the manipulation assembly; and
a battery pack insertable into the container, wherein the container comprises:
an accommodation part having a space therein to accommodate the battery pack; and
a cover for opening and closing the accommodation part; and
a locking structure configured to engage with the cover to prevent the cover from opening, and become damaged when an external force greater than a predetermined amount is applied thereto, the predetermined amount being greater than a weight of the battery pack.

2. The surgical instrument of claim 1, wherein
the manipulation assembly comprises a coupling region detachably coupled with the driving assembly, and
the coupling region of the manipulation assembly comprises a coupling groove defined to accommodate at least one region of the driving assembly in one direction.

3. The surgical instrument of claim 1, wherein the container has a plurality of regions having different widths, and a width of the container at one end of the container is narrower than a width of the container at another end of the container.

4. The surgical instrument of claim 1, wherein the container has a structure that becomes narrower from an entrance of the container into which the battery pack is inserted to at least one inner region of the container.

5. The surgical instrument of claim 1, wherein one end portion of a body of the cover is coupled to one end portion of the accommodation part of the container.

6. The surgical instrument of claim 1, wherein the driving assembly is a battery pack for supplying power to the manipulation assembly.

7. The surgical instrument of claim 1, wherein
the locking structure is disposed on one side of an opening of the container and protrudes toward the cover,
the cover includes a locking groove defined at a position corresponding to the locking structure, and
the locking structure engages with the locking groove when the cover closes the opening of the container.

8. The surgical instrument of claim 7, wherein
when the external force is applied to the locking structure in a closing direction of the cover, the locking structure deforms to secure the cover in a closed state, and
when the external force is applied to the locking structure in an opening direction of the cover, the locking structure becomes irreversibly damaged to prevent reuse of the container.

9. The surgical instrument of claim 1, wherein the locking structure, when damaged, is broken.

10. A driving assembly configured to be detachably coupled to a manipulation assembly of a surgical instrument and to supply a driving force for an operation of an end tool through the manipulation assembly, the driving assembly comprising:
- a container configured to be detachably coupled to the manipulation assembly; and
- a battery pack insertable into the container, the container comprising:
  - an accommodation part having a space therein to accommodate the battery pack;
  - a cover for opening and closing the accommodation part; and
  - a locking structure configured to engage with the cover to prevent the cover from opening, and become damaged when an external force greater than a predetermined amount is applied thereto, the predetermined amount being greater than a weight of the battery pack.

11. The driving assembly of claim 10, wherein the container has a plurality of regions having different widths, and a width of the container at one end of the container is narrower than a width of the container at another end of the container.

12. The driving assembly of claim 10, wherein the container has a structure that becomes narrower from an entrance of the container into which the battery pack is inserted to at least one inner region of the container.

13. The driving assembly of claim 10, wherein the container further comprises a coupling part configured to support and fix the battery pack inside the accommodation part.

14. The driving assembly of claim 13, wherein the coupling part is configured to be damaged when an external force greater than a predetermined amount is applied thereto.

15. The driving assembly of claim 10, wherein
the locking structure is disposed on one side of an opening of the container and protrudes toward the cover,
the cover includes a locking groove defined at a position corresponding to the locking structure, and
the locking structure engages with the locking groove when the cover closes the opening of the container.

16. The driving assembly of claim 15, wherein
when the external force is applied to the locking structure in a closing direction of the cover, the locking structure deforms to secure the cover in a closed state, and
when the external force is applied to the locking structure in an opening direction of the cover, the locking structure becomes irreversibly damaged to prevent reuse of the container.

17. The driving assembly of claim 10, wherein the locking structure, when damaged, is broken.

18. A charger for charging a battery pack of a surgical instrument, the charger comprising:
- a charging device comprising a charger terminal, the charger terminal being configured to come into contact with a charging terminal of the battery pack and charge a battery of the battery pack; and
- a support protruding out of the charging device by a predetermined amount to support and fix the battery pack,
wherein the support is configured to engage or disengage the battery pack when a predetermined pressure is applied thereto.

19. The charger of claim 18,
wherein the support comprises a latch member and an elastic member,
wherein the elastic member is configured to press the latch member from an inside of the charging device toward an outside,
wherein the latch member is configured to be pressed by the battery pack to engage or disengage the battery pack.

* * * * *